(12) United States Patent
Jayamohan et al.

(10) Patent No.: US 8,321,874 B2
(45) Date of Patent: Nov. 27, 2012

(54) INTELLIGENT CONTEXT MIGRATION FOR USER MODE SCHEDULING

(75) Inventors: Ajith Jayamohan, Redmond, WA (US);
Arun U. Kishan, Bellevue, WA (US);
Dave Probert, Woodinville, WA (US);
Pedro Teixeira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 12/242,566

(22) Filed: Sep. 30, 2008

(65) Prior Publication Data

US 2010/0083261 A1 Apr. 1, 2010

(51) Int. Cl.
*G06F 9/40* (2006.01)
(52) U.S. Cl. ........................................................ 718/108
(58) Field of Classification Search .................... None
See application file for complete search history.

(56) References Cited

U.S. PATENT DOCUMENTS

| | | | |
|---|---|---|---|
| 5,481,719 A | 1/1996 | Ackerman et al. | |
| 5,758,184 A * | 5/1998 | Lucovsky et al. | 710/6 |
| 5,872,963 A | 2/1999 | Bitar et al. | |
| 6,189,023 B1 * | 2/2001 | Emlich et al. | 718/100 |
| 6,289,369 B1 | 9/2001 | Sundaresan | |
| 6,349,355 B1 * | 2/2002 | Draves et al. | 711/6 |
| 6,560,626 B1 | 5/2003 | Hogle et al. | |
| 6,578,055 B1 | 6/2003 | Hutchison et al. | |
| 6,611,878 B2 * | 8/2003 | De Armas et al. | 719/328 |
| 6,732,138 B1 * | 5/2004 | Browning et al. | 718/102 |
| 6,766,515 B1 | 7/2004 | Bitar et al. | |
| 7,100,172 B2 * | 8/2006 | Voellm et al. | 719/332 |
| 7,114,164 B2 | 9/2006 | Smith et al. | |
| 7,178,062 B1 | 2/2007 | Dice | |
| 7,269,722 B1 | 9/2007 | Neary | |
| 7,275,247 B2 | 9/2007 | Mendoza et al. | |
| 7,302,613 B2 * | 11/2007 | Bliss et al. | 714/38.11 |
| 7,373,640 B1 | 5/2008 | English et al. | |
| 7,814,549 B2 | 10/2010 | Park | |
| 8,006,246 B2 | 8/2011 | Kwon | |
| 8,010,822 B2 * | 8/2011 | Marshall et al. | 713/324 |
| 8,051,418 B1 * | 11/2011 | Dice | 718/102 |
| 2004/0252709 A1 | 12/2004 | Fineberg | |
| 2005/0197815 A1 | 9/2005 | Grebenev | |

(Continued)

FOREIGN PATENT DOCUMENTS

WO    WO 00/62160 A2 * 10/2000

(Continued)

OTHER PUBLICATIONS

Draves, R. P. etal., Unifying the User and Kernel Environments, 1997, Microsoft Research, Technical report MSR-TR-97-10, 18 pages.*

(Continued)

*Primary Examiner* — Eric Coleman
(74) *Attorney, Agent, or Firm* — Lee & Hayes, PLLC

(57) ABSTRACT

Performing directed switches between user mode schedulable (UMS) threads and primary threads enable proper execution of the UMS threads. A primary thread user portion is switched to a UMS thread user portion so that the UMS thread user portion is executed in user mode via the primary thread user portion. The primary thread is then transferred into kernel mode via an implicit switch. A kernel portion of the UMS thread is then executed in kernel mode using the context information of a primary thread kernel portion.

20 Claims, 17 Drawing Sheets

U.S. PATENT DOCUMENTS

| | | |
|---|---|---|
| 2005/0229258 A1 | 10/2005 | Pigin |
| 2005/0289545 A1 | 12/2005 | Blinick et al. |
| 2006/0075404 A1 | 4/2006 | Rosu et al. |
| 2006/0123148 A1 | 6/2006 | Callender et al. |
| 2007/0074217 A1 | 3/2007 | Rakvic et al. |
| 2007/0124729 A1 | 5/2007 | Ko et al. |
| 2007/0130569 A1 | 6/2007 | Heffley et al. |
| 2007/0271450 A1 | 11/2007 | Doshi et al. |
| 2008/0040800 A1 | 2/2008 | Park |

FOREIGN PATENT DOCUMENTS

| | | |
|---|---|---|
| WO | WO2007017683 A1 | 2/2007 |

OTHER PUBLICATIONS

Anderson et al., "Scheduler Activations: Effective Kernel Support for the User-Level Management of Parallelism" retrieved on Jun. 4, 2008 at <<http://www.cs.pdx.edu/~walpole/class/cs533/winter2006/slides/72.ppt>>, Proc 13th ACM Symposium on Operating Systems Principles, Oct. 1991, 19 pgs.

Armand et al., "Multi-threaded Processes in CHORUS/MIX", retrieved on Jun. 4, 2008 at <<http://www.teaser.fr/~pleonard/publications/chorus/CS-TR-89-37.pdf>>, Proceedings of the EEUG Spring '90 Conference, Munich, Germany, Apr. 1990, 16 pgs.

Duffy, "Concurrency and the Impact on Reusable Libraries", retrieved Jun. 5, 2008 at <<http://www.bluebytesoftware.com/blog/PermaLink,guid,f8404ab3-e3e6-4933-a5bc-b69348deedba.aspx>>, Bluebytesoftware, Joe Duffy's Weblog, Oct. 26, 2006, pp. 1-20.

Henderson, "Inside the SQL Server 2000 User Mode Scheduler", retrieved on Jun. 6, 2008 at <<http://msdn.microsoft.com/en-us/library/aa175393.aspx>>, Microsoft Corporation, Feb. 2004, 8 pgs.

"INFO: Managing Thread Termination", retrieved Jun. 5, 2008 at <<http://support.microsoft.com/kb/254956>>, Microsoft Support, Feb. 2007, pp. 1-2.

Marsh et al., "First-Class User-Level Threads" retrieved on Jun. 4, 2008 at <<http://www-cse.ucsd.edu/classes/wi01/cse221/marsh,scott,leblanc,markatos.first-class_user-level_threads.pdf>>, ACM SIGOPS Operating Systems Review, vol. 25, Issue 5, Oct. 1991, 12 pgs.

"Scheduling, Thread Context, and IRQL", retrieved Jun. 5, 2008 at <<http://msdn.microsoft.com/en-us/library/ms810029.aspx>>, Microsoft, Jul. 2004, pp. 1-18.

Non-Final Office Action for U.S. Appl. No. 12/242,648, mailed on Mar. 15, 2012, Ajith Jayamohan et al, "Transparent User Mode Scheduling on Traditional Threading Systems", 16 pages.

Office action for U.S. Appl. No. 12/242,648, mailed on Aug. 24, 2012, Jayamohan et al., "Transparent User Mode Scheduling on Traditional Threading Systems", 20 pages.

* cited by examiner

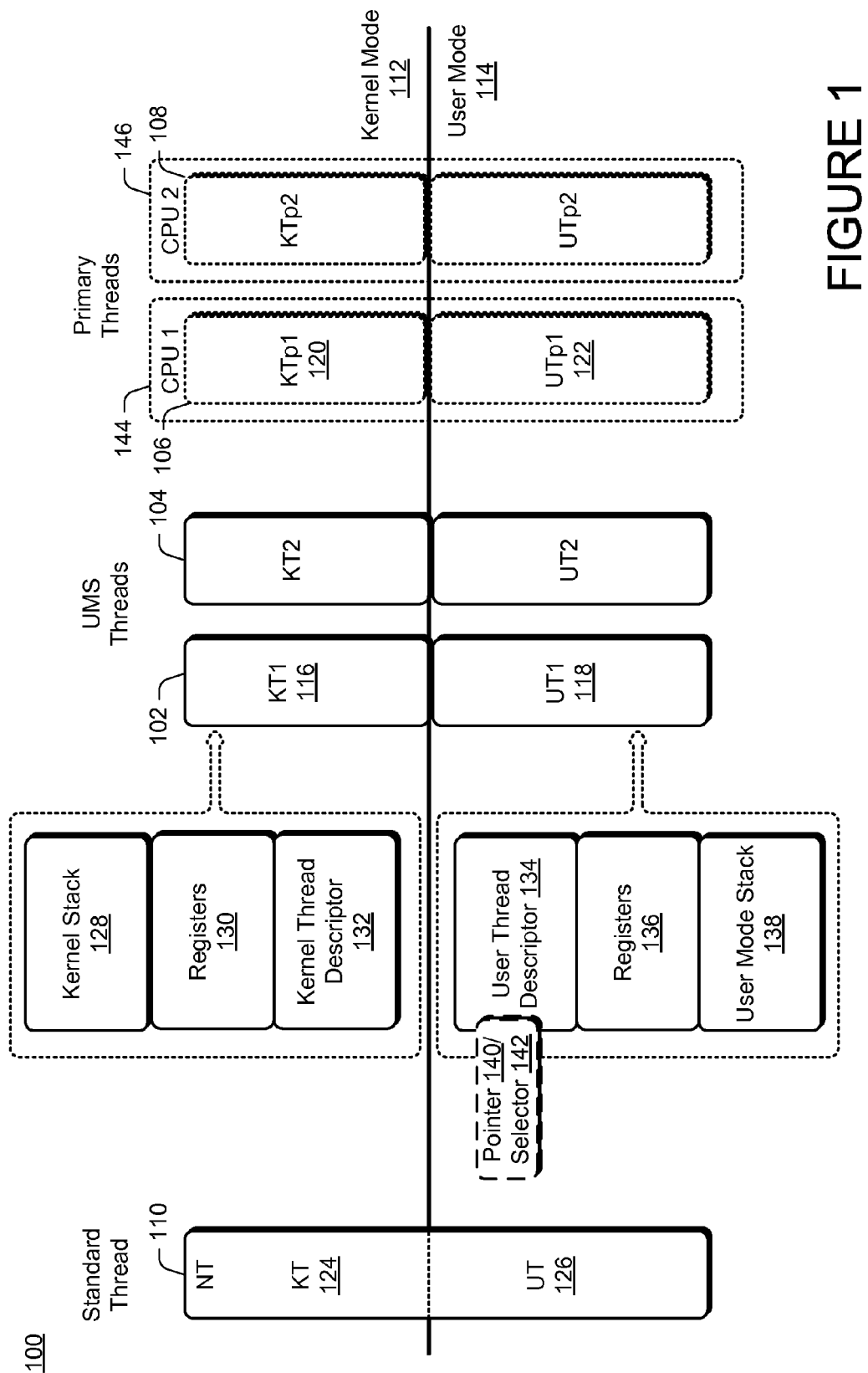

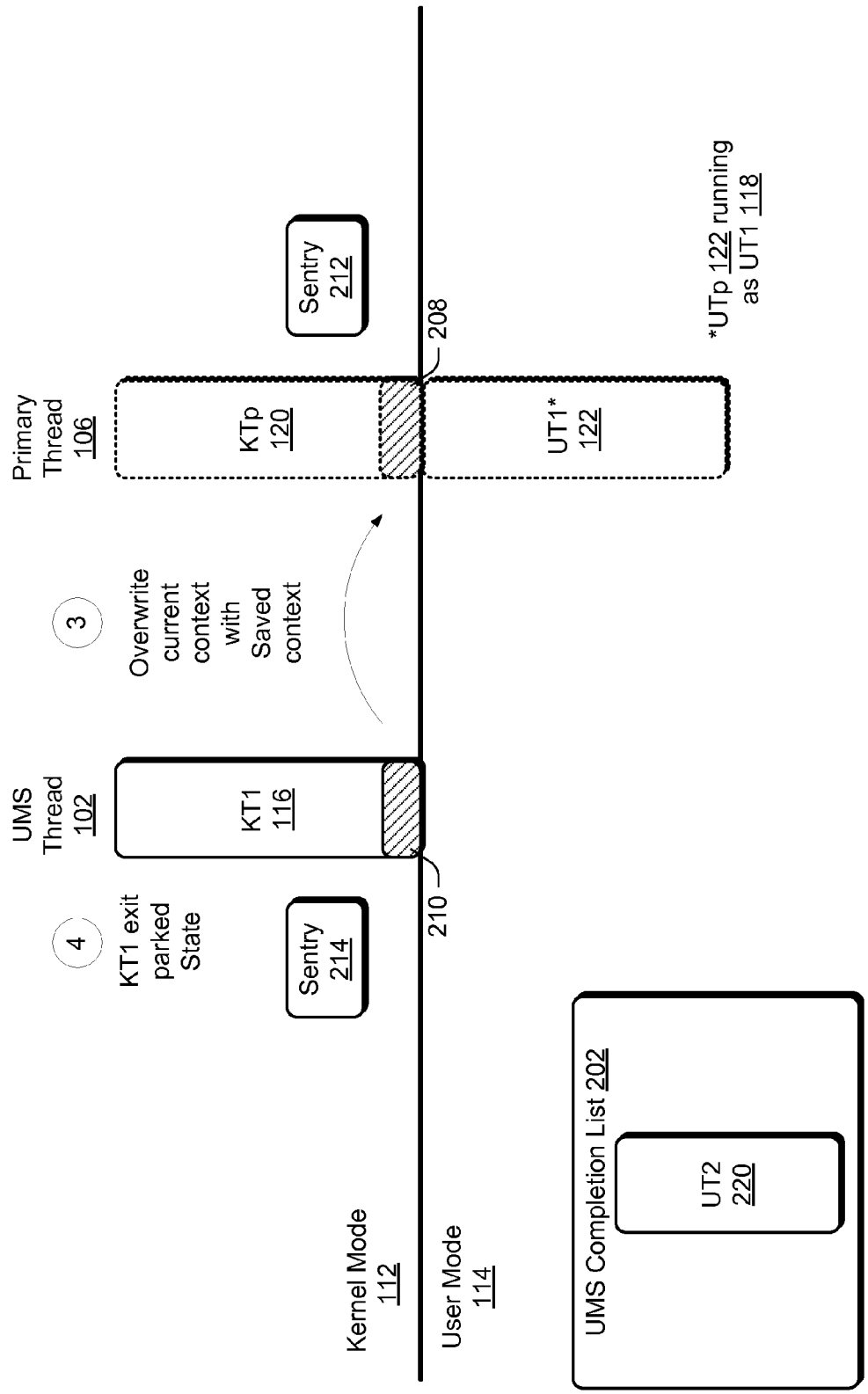

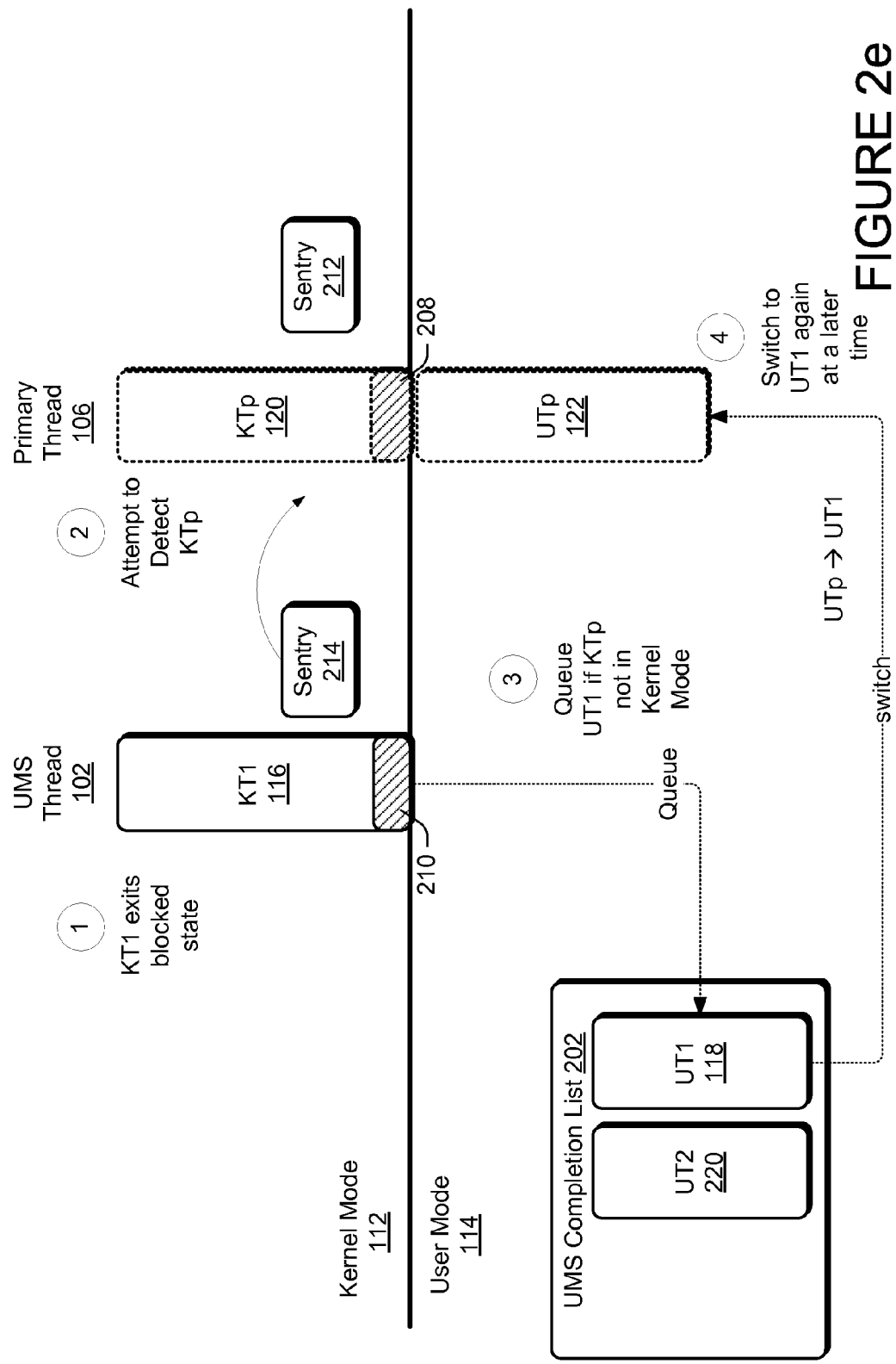

INTELLIGENT CONTEXT MIGRATION FOR USER MODE SCHEDULING

CROSS REFERENCE TO RELATED APPLICATIONS

This application is related to concurrently-filed U.S. patent application Ser. No. 12/242,648, entitled "Transparent User Mode Scheduling on Traditional Threading Systems," which is incorporated herein by reference.

BACKGROUND

User mode scheduling enables processes to switch user threads for better concurrency and control. User mode schedulable (UMS) threads are divided into distinct user and kernel portions. However, the division of a UMS threads into a user portion and kernel portion may cause difficulties during thread execution.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for directed switches for the proper execution of UMS threads. In at least one embodiment, a user portion of primary thread is switched to a user portion of a UMS thread so that the user portion of the UMS thread may be executed by the primary thread in user mode. The primary thread may then transfer into kernel mode via an implicit switch. A kernel portion of the UMS thread is then executed in kernel mode using the context information migrated from the kernel portion of the primary thread that was executing the user portion of the UMS thread prior to entry into kernel mode. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 1 is a block diagram illustrating an exemplary multi-processor environment for the execution of user mode schedulable (UMS) threads, in accordance with various embodiments.

FIGS. 2a-2g are block diagrams illustrating a directed switch between a user mode schedulable (UMS) thread and a primary thread of a central processing unit (CPU), in accordance with various embodiments.

DETAILED DESCRIPTION

Figure 2A:
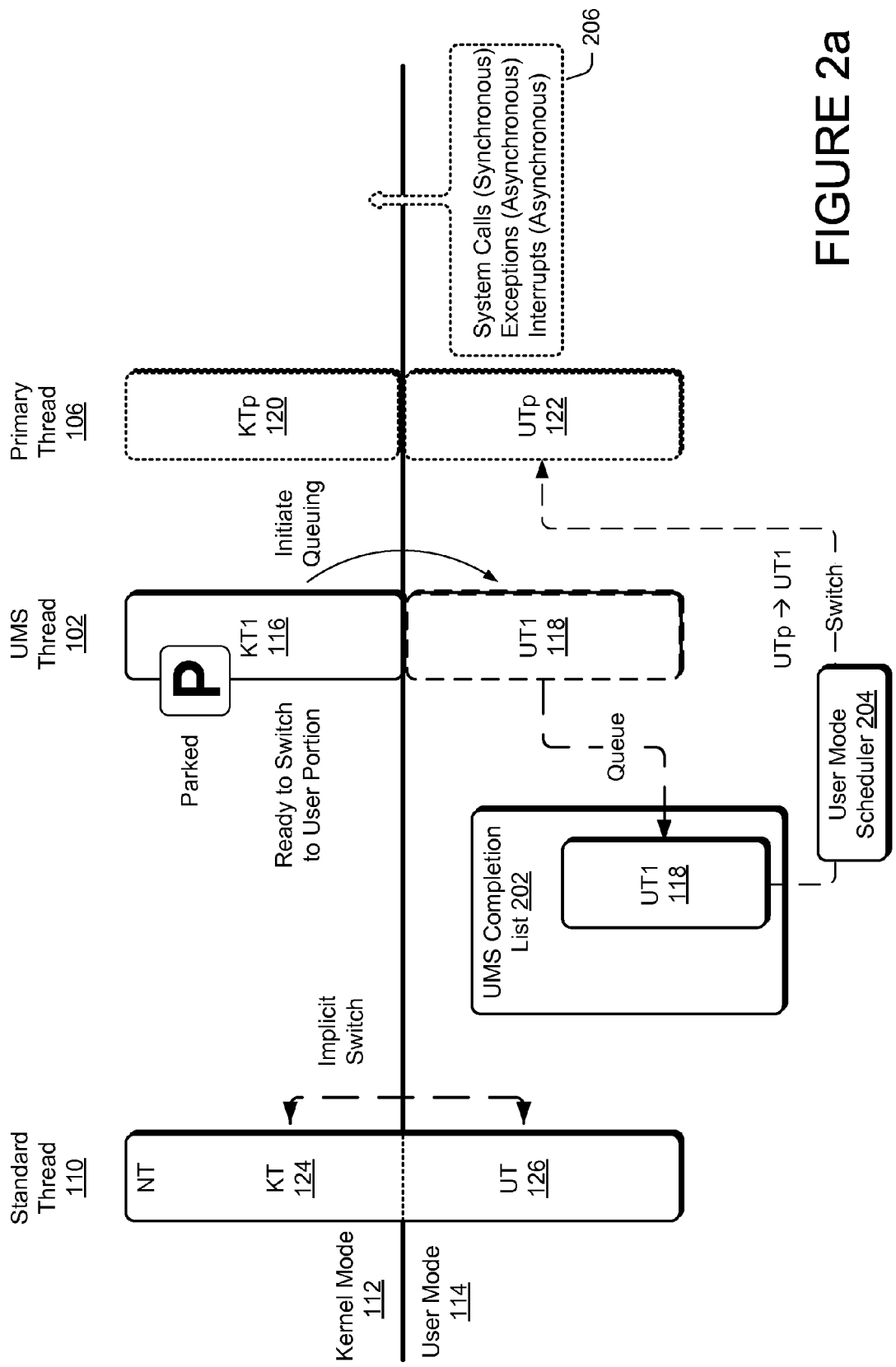

This disclosure is directed to embodiments of directed switches for the proper execution of user mode schedulable (UMS) threads. In a multi-processor environment, the UMS threads are program threads that may be executed by one or more central processor units (CPUs) in the context of an operating system process. The UMS threads are similar to process threads currently in use on computing platforms in that each UMS thread includes a kernel portion and a user portion.

The execution of a typical process thread may involve the recurring processing of the kernel portion of the thread in kernel mode, in conjunction with the recurring processing of the user portion in user mode, and the automatic switching between the two modes. In contrast, due to the unique architecture of the computing platform on which the UMS threads are executed, the operating system does not generally switch to the user portion of UMS threads to cause them to execute in user mode. In other words, the user portion of a UMS thread is normally not directly executed by the operating system. Instead, inside the application running in user mode the user portions of UMS threads are "switched" with the user portions of special threads, which are referred to herein as primary threads.

In turn, the user portions of the primary threads may then be executed in user mode. However, this "substitution" of a primary thread user portion by a UMS thread user portion may create a mismatch of identities between the primary thread user portion and the kernel portion of the UMS thread once the primary thread executing on behalf of the user portion of UMS thread returns to kernel mode. This is important since state required to execute properly in kernel mode is attached to the kernel portion of the UMS thread. For example, but not as a limitation, such states may include security context. Accordingly, a process referred to as a "directed switch" may be performed to remedy such mismatches and provide smooth transition between the user portion and the kernel portion of the UMS thread, and vice versa. In some instances, such "directed switches" may be optimized to increase performance speed and reduce the use of processing resources. Further, directed switches may enable UMS threads to be executed transparently in an operating system, that is, in the same way as standard threads. The embodiments described herein are directed to the implementations and optimizations of directed switches. Accordingly, various examples of directed switch implementation and optimization are described below with reference to FIGS. 1-11.

Exemplary Schemes

FIG. 1 is a block diagram illustrating an exemplary multi-processor environment 100 for the execution of user mode schedulable (UMS) threads, in accordance with various embodiments. As shown, the exemplary multi-processor environment 100 may include one or more UMS threads, such as UMS thread 102 and 104. The exemplary multi-processor environment 100 may also include one or more primary threads, such as primary threads 106 and 108, and one or more process threads, such as standard thread 110. In at least one embodiment, the standard thread 110 may be a NT thread that is part of the Windows NT® computing environment.

Each of the threads in the exemplary multi-processor environment 100 comprises a kernel portion that resides in kernel mode 112, and a user portion that resides in user mode 114. The kernel and user modes are standard ways of dividing the execution of threads in a computer system between operating system activities, such as activities performed by an operating system (OS) kernel, and application activities, such as those performed by a user's program. In various embodiments, kernel mode 112 is implemented by the operating environment for a kernel of an operating system, i.e., the OS kernel. Kernel mode 112 is generally a privileged mode of operation with direct access to the hardware resources in the machine. Generally speaking, the OS kernel is responsible for managing a computing system's resources (i.e., hardware and software components). As a basic component of an operating system, the OS kernel provides the lowest-level abstraction layer for computing resources (e.g., memory, processors and I/O devices) that an application needs to control for the performance of various functions.

For example, the UMS thread 102 may include a kernel portion 116 and a user portion 118. Likewise, the primary thread 106 may include a kernel portion 120 and a user portion 122. Additionally, the standard thread 110 may include a kernel portion 124 and a user portion 126.

Moreover, the kernel and user portions of each thread in the exemplary multi-processor environment 100 may also include additional memory structure. For example, the kernel portion 116 may include a kernel stack 128, registers 130, and a kernel structure that describes the kernel portion 116, which is the kernel thread descriptor 132. Furthermore, the user portion 118 may include a user thread descriptor 134, which is a block of memory in the user portion 118. The user portion 118 may further include registers 136, and a user mode stack 138.

It will be appreciated that the UMS thread 102 is distinguishable from a standard thread, such as the standard thread 110. In various embodiments, a UMS thread may differ from a standard thread in that the scheduling assignments of CPUs to the UMS kernel portion and the UMS user portion may be independently managed by an application, while the kernel and user portions of a standard thread generally are assigned in unison. Thus, while switching between the kernel portion 124 and the user portion 126 of the standard thread 110 usually occurs implicitly during thread execution on a central processing unit (CPU), the UMS thread may provide applications with the ability to control the switch between the various user portions of its threads during execution. This capability allows applications to achieve higher performance because it is not always necessary to also switch the kernel portions of threads.

The UMS threads, such as the UMS threads 106 and 108, may be created from standard threads, such as standard thread 110. In embodiments where the multi-processor environment 100 is running on IA-64 (Itanium) CPU architecture, for example, the creation of a UMS thread may involve the use of a special pointer 140 to the UMS states that are stored in the user thread descriptor of the UMS thread. The special pointer 140 may be stored in a register that is accessible by other threads.

Alternatively, in embodiments where the multi-processor environment 100 is running on one of an x86 and x64 CPU architecture, the creation of a UMS thread may involve the use of a segment selector 142 that points to the user thread descriptor of the UMS thread. Accordingly, the special pointer and/or the segment selector of a UMS thread may enable other threads, such as the primary threads, to access the states of the UMS thread, as stored in its corresponding user thread descriptor.

The primary threads, such as primary thread 106 and the 108, may act as virtual processors for an application. In some embodiments, the number of primary threads present in the multi-processor environment 100 may correlate with the number of CPUs present in the environment. For example, the primary thread 106 may execute on the CPU 144, while the primary thread 108 may execute on the CPU 146. However, in other embodiments, the number of primary threads present may be greater or fewer than the number of CPUs in the multi-processor environment 100.

A primary thread may act as virtual processor for executing the user portions of a UMS thread. For example, but not as a limitation, an application running the user portion 122 of primary thread 106 on the CPU 144 can switch execution to the user portion 118 of the UMS thread 102. The application can subsequently switch to execution other user portions of its threads without any intervention from the OS kernel.

In various embodiments, a primary thread may be constructed from a standard thread 110, such as an NT thread, with the addition of an extra state. Thus, a primary thread may convert back and forth from a standard thread based on application resource availability and scalability requirements.

FIGS. 2a-2g are block diagrams illustrating an exemplary directed switch between a user mode schedulable (UMS) thread and a primary thread of a central processing unit (CPU), in accordance with various embodiments. It will be appreciated that while the FIGS. 2a-2h are illustrated with respect to a single primary thread 106, the multi-processor environment 100 may include a plurality of primary threads running on multiple CPUs.

As shown in FIG. 2a, the exemplary UMS thread 102 may include a kernel portion 116 that resides in kernel mode 112, and a user portion 118 that resides in user mode 114. It will be appreciated that the execution of the UMS thread 116 differs from the execution of the standard thread 110 (FIG. 1). Standard thread processing is generally dependent on the automatic, that is, implicit switch between a kernel portion of a thread and a user portion of a thread. For example, during the execution of the standard thread 110 (FIG. 1), a CPU may process the kernel portion 124 of the standard thread 106 in kernel mode 112. Subsequently, the CPU may change from kernel mode 112 to user mode 114 by automatically switching from the kernel portion 124 of the standard thread 110 to the user portion 126. The user portion 126 of the standard thread 110 is then further processed in user mode. Additionally, when the execution is to be switched to the user portion of another standard thread, the current user portion 126 needs to switch to its kernel portion 124, which then switches to the kernel portion of the next standard thread to run. The kernel portion of the next standard thread may also further switch to its user portion in the same manner. Typically this also involves processing kernel data structures shared across the system in order to select the next thread for execution.

However, during the processing of a UMS thread, the kernel portion of the UMS thread is generally not required to switch to the user portion of another thread. The prevention of automatic switching from a user portion to a kernel portion of a UMS thread during processing is a fundamental principle of the UMS computing architecture. This architecture may enable computer applications to have greater control over the concurrency and efficiency of threads in both single-processor and multi-processor environments.

Instead, the UMS threads may use alternative implementations to perform tasks in user mode 114. A particular alternative implementation is illustrated in FIG. 2a with respect to the UMS thread 102. As shown, the CPU has performed the necessary tasks for the kernel portion 116 of the UMS thread 102. Accordingly, the UMS thread 102 is ready to switch to user mode 114. At this point, the kernel portion 116 of the UMS thread 102 may cause user portion 118 of the UMS thread 102 to queue to a UMS completion list 202. The UMS completion list 202 is a UMS data structure on which the OS kernel queues user portions of the UMS threads that are ready for execution in user mode 114. Applications may then retrieve the UMS threads from the UMS completion list 202 for execution.

Subsequently, the kernel portion 116 of the UMS thread 102 may place itself in a "parked" state (i.e., a type of ready waiting state). The queuing of the user portion 118 may be observed by a user mode scheduler 204. In some embodiments, the completion list 202 may include an object that informs the user mode scheduler 204 that a thread has been queued.

In various embodiments, the user mode scheduler 204 may be configured to "pull" threads from the UMS completion list 202. In one embodiment, the user mode scheduler 204 may periodically check the completion list 202 for threads that have been queued in user mode. In another example, the user mode scheduler 204 may only check the completion when it is informed that a thread has been queued to the completion list 202 through an asynchronous notification event.

During the "pulling" of the UMS thread 102, the user mode scheduler 204 may cause the user portion 122 of the primary thread 106 to switch to the user portion 118 of the UMS thread 102. In various embodiments, the switch may be accomplished by saving the context state of the user portion 122 and loading the context state of the user portion 118 (as queued in the completion list 202). In at least one such embodiment, the transfer of context state of the user portions 118 and 122 includes the switching to the user thread descriptor 134 of the UMS thread 102 using one of the pointer 140 or the segment selector 142. Subsequently, the user thread 102 may execute in user mode 114 in place of the primary thread 106.

In other embodiments, the queuing of the user portion 118 of the exemplary UMS thread 102, as well as the placement of the kernel portion 116 in a "parked" state, may also occur during creation of a UMS thread. UMS thread creation refers to the conversion of a process thread, such as standard thread 110, into a UMS thread, such as the UMS thread 102. During the UMS thread creation, the UMS thread 102 may perform kernel side initialization of its kernel portion 116. Next, the kernel portion 116 may cause the user portion 118 of the UMS thread 102 to be queued to the completion and then "park" the kernel portion of the UMS thread in a waiting state.

At some point in the execution of the user portion 118 of UMS thread 102, the user portion 118 may need to re-enter kernel mode 112 and switch to its kernel portion 116. In various instances, this need may arise due to the occurrence of one of the operations 206. The operations 206 may include a system call (synchronous entry into kernel mode), an exception (asynchronous entry into kernel mode), or an interrupt (asynchronous entry into kernel mode). As used herein, "synchronous" refers to a situation where entry to kernel mode is synchronized with the execution design of the user portion and thus only a certain portion of the information in a register of a UMS thread needs to be saved and later re-loaded, while "asynchronous" refers to a situation where the execution of the user portion is interrupted essentially at a random point and thus all the information in the register is critical to entry of kernel mode. It will be appreciated that while system calls and exceptions are thread-specific, interrupts are not specific to any thread.

The switch from the user portion 118 of UMS thread 102 to the kernel portion 116 may need special steps that are not necessary for the implicit switch from the user portion 126 to the kernel portion 124 of a standard thread 110 (FIG. 1). To provide isolation between application and operating system execution, user mode 114 and kernel mode 112 provide special register state to reduce how much saving and loading is required when switching from the user portion of a standard thread to the kernel thread, such as providing a separate register pointing to the kernel mode stack 128. These special facilities in the CPU architecture make some of the state save restore when switching between the user and kernel portions of the same thread "implicit".

However, in the instance of the primary thread 106, an "implicit switch" does not produce the desired result because the user portion 122 of the primary thread 106 has been replaced by the user portion 118 of the UMS thread 102. In other words, as far as the OS kernel last knew the state of what was running in user mode on the processor, it was the user portion 122 of the primary thread 106. This is because a switch from user portion 122 to the user portion 118 in the UMS thread 102 can occur without the awareness of the OS kernel. Thus, when the user portion 122 enters kernel mode 112, the implicit switch will take it to the kernel portion 120 of the primary thread 106. However, since the user portion 122 was really replaced by the user portion 118 of the UMS thread 102, the user portion 118 will actually enter kernel mode 112.

Accordingly, when the user portion 118 of UMS thread 102, not the user portion 122 of the primary thread 106, enters kernel mode 112, the OS kernel that is expecting the user portion 122 of primary thread 106 may detect the mismatch based on the identities of each user portion. For example, the OS kernel may detect the mismatch via a sentry 212. The sentry 212 is further described below with respect to FIG. 2c. In various embodiments, the identity of each user portion of each thread, which is part of the context information of each thread, may be stored in the kernel thread descriptors. For example, the identity of the UMS thread 102 may be stored in its thread descriptor 132 (FIG. 1), while the identity of the primary thread 106 may be stored in its corresponding kernel thread descriptor (not shown).

For correct operation of the system, the OS kernel needs to handle this case where the "implicit switch" will run the kernel portion of the wrong thread. Therefore, in the example of the UMS thread 102, the OS kernel may switch from the kernel portion 120 of the primary thread 106 to the kernel portion 116 once the UMS thread 102 enters kernel mode 112. This cross-thread switching process is referred to as a "directed switch." Thus, directed switches may enable UMS threads to be executed transparently in an operating system, that is, in the same way as standard threads.

Figure 2B:
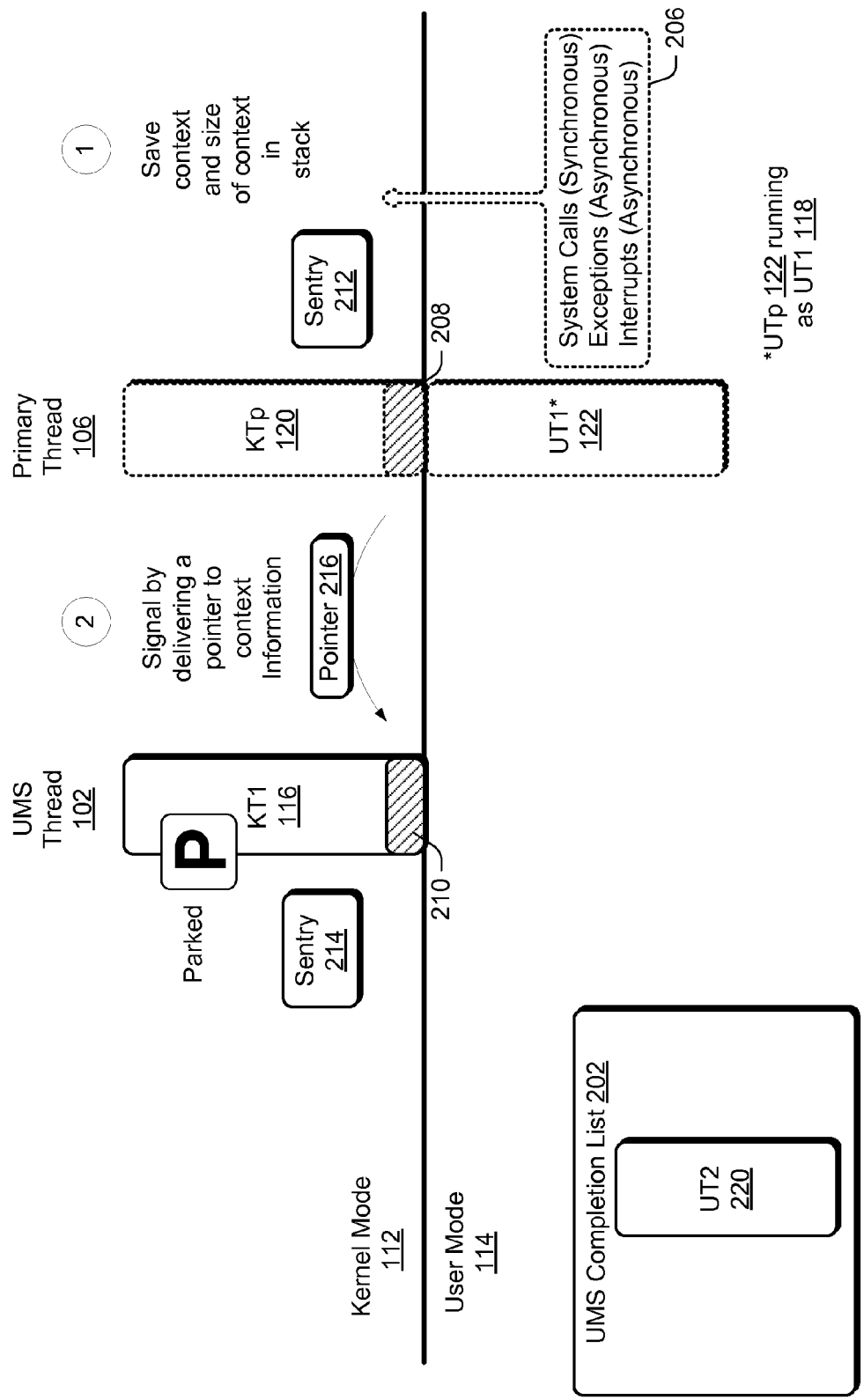

FIG. 2b illustrates a directed switch in accordance with various embodiments. The directed switch enables a kernel portion of a primary thread to switch to a kernel portion of UMS thread for the purpose of continuing execution of the UMS thread in kernel mode. The directed switch is illustrated with respect to the UMS thread 102 and the primary thread 106. As shown, the directed switch may be accomplished by exchanging context information 208 of the kernel portion 120 (primary thread 106) with the context information 210 of the "parked" kernel portion 116 (UMS thread 102). This process may be referred to as "context migration." As used herein, "context information" refers to the state of a thread, which may include all the registers that the thread may be using, as well as other operating system specific data necessary for the execution of the thread. In this way, when the kernel portion 116 "wakes up" from its "parked" state, it may start performing work in kernel mode 112.

In various embodiments, the directed switch may be facilitated by a sentry 212 and a sentry 214. The sentry 212 may be a piece of code that resides in kernel mode 112 for each primary thread, such as primary thread 106. Likewise, the sentry 214 may be a piece of code that resides in kernel mode 112 for each UMS thread, such as UMS thread 102. In other words, the sentries 212 and 214 are code algorithms that run synchronously with each thread execution.

The sentry 212 may check primary thread components that come into kernel mode 112. For example, but not as a limitation, the sentry 212 may check to see whether a primary thread 106 is entering kernel mode 112 on its own behalf, or whether the primary 108 is entering kernel mode 112 while running as a UMS thread, such as the UMS thread 102. In some embodiments, the sentry 212 may make this determination by ascertaining whether the identity (e.g., identification information in the user thread descriptor) of the user portion 122 of the primary thread 106 matches the identity of the kernel portion 120 of the primary thread 106.

When the sentry 212 detects that the kernel portion of the primary thread is running on behalf of the user portion of another thread, such as the kernel portion 120 running on behalf of the user portion 118, a directed switch needs to be performed. The directed switch will rectify the mismatch and make it so that the kernel portion 116 of UMS thread 102 is running on behalf of the user portion 118 of the UMS thread 102.

During the directed switch, the CPU and register states of the UMS thread 102 are initially saved to a memory stack, such as the kernel stack 128, as context information 208. In various embodiments, the actual amount of the CPU and register states saved to the memory stack may depend on whether the primary thread entered kernel mode 112 as a result of a synchronous or asynchronous event, as described above. Moreover, in at least one embodiment, the saved context information 208 may also include data on the size of the context information 208. For example, in a synchronous event, a user code generally knows what to expect on return from the call to the kernel in terms of processor state. Thus, during the occurrence of system calls, volatile register states do not generally need to be saved to the memory stack.

Once the context information 208 has been saved, the kernel portion 120 of the primary thread 106 may prepare a pointer 216 to the context information 208. The pointer 216 may enable another thread to locate the context information 208. The primary thread 106 may then deliver the pointer 216 to the kernel portion 116 of the UMS thread 102.

FIG. 2c illustrates a context switch that occurs following the delivery of a pointer from the kernel portion of the primary thread to a parked kernel portion of a UMS thread. The context switch is illustrated with respect to the UMS thread 102 and the primary thread 106. As shown, once the pointer 216 is delivered to the UMS thread 102, the UMS thread 102 may "wake up" from its parked state.

Subsequently, the UMS thread 102 may replace its context information 210 with the context information 208. The UMS thread 102 may accomplish this replacement via a copy and override operation. In at least one embodiment, the UMS thread 102 may replace the context information 210 utilizing data on the size of the context information 208. Following the replacement of context information, the kernel portion 116 of the UMS thread 102 will not retain any memory that was previously in a "parked" state. Subsequently, the UMS thread 102 may be executed by a CPU in kernel mode 112. It will be appreciated that since only the UMS thread 102 is executed in kernel mode 112, the primary thread 106 does not actually need to retain any knowledge regarding the nature of the request (e.g., system call, exception, etc.) that made it enter kernel mode 112. Moreover, following the replacement of the context information 210, the primary thread 106 may be disassociated from the UMS thread 102. In various embodiments, the UMS thread 102 may go into a blocked state following execution in kernel mode 112. Further, in at least one embodiment, the UMS thread 102 may exit its blocked state when called upon by the user mode scheduler 204 to perform another execution. In some embodiments, the user mode scheduler 204 may choose to switch to the user portion 220 of the UMS thread 102 so that the user portion 220 may be executed.

Figure 2D:
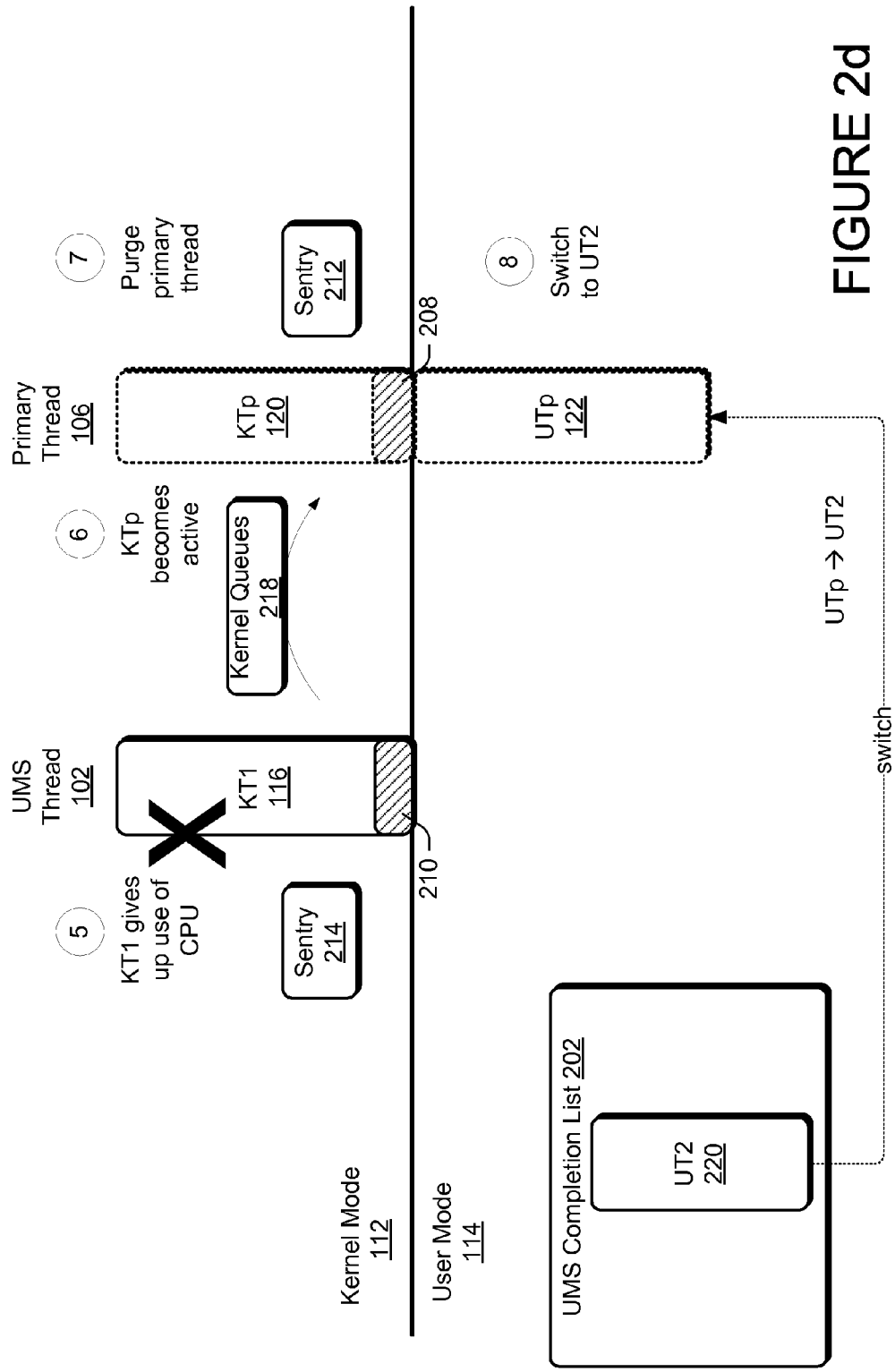

FIG. 2d illustrates the wakeup of a primary thread 106 from its blocked state following an event that stops a UMS thread from using a CPU. The wakeup is illustrated in the context of primary thread 106 and the UMS thread 102. In at least one embodiment, the wakeup of the primary thread 106 may occur after the suspension of the UMS thread 102 described in FIG. 2c. In other embodiments, the primary thread 106 may wake up after the execution of the kernel portion 116 of the UMS thread 102 in kernel mode 112 is completed.

As shown, the primary thread 106 may automatically wake up if the UMS thread 102 becomes blocked, i.e., enters into a blocked state, or goes back into a "parked" state (e.g., when execution of the kernel portion 116 is completed), or otherwise gives up its use of the CPU in some manner. For example, but not as a limitation, the UMS thread 102 may enter into a blocked state when it has to perform data retrieval from a remote memory location that results in a long latency stall. In other examples, the kernel portion 116 of the UMS thread 102 may return itself to a "parked" state.

In such instances, kernel queues 218 may wake up the primary thread. In various embodiments, a kernel queue 218 is a mechanism that may be configured to monitor system operations and registers events. The kernel queue 218 may also notify appropriate components of changes to the system operation and register events. Upon waking up, the kernel portion 120 of the primary thread 106 may clear itself of the register states that are associated with the UMS thread 102. In some embodiments, having cleared its register states, the primary thread 106 may switch to its own user portion 122, and enter the user mode scheduler 204 (FIG. 2a) which may then switch to a UMS threads user portion, such as user portion 220, for processing in user mode 114.

FIG. 2e illustrates the actions of a UMS thread after it has exited a blocked state, in accordance with various embodiments. The actions are illustrated in the context of primary thread 106 and the UMS thread 102. As shown, when the UMS thread 102 becomes unblocked (e.g., such as when a time period for processing object retrieval expires and the thread awakes), the UMS thread 102 may be ready to exit kernel mode 112 to user mode 114. In other embodiments, the UMS thread 102 may also be ready to exit kernel mode 112 to user mode 114 when it has completed its work in kernel mode 112.

When the UMS thread 102 is ready to exit user mode 114, the UMS thread 102 may activate the sentry 214 to detect whether the kernel portion 120 of the primary thread 106 has exited kernel mode 112. For example, as described in FIG. 2d, the primary thread 106 may exit kernel mode 112 to switch to another thread.

If the sentry 214 detects that the primary thread 106 has already exited kernel mode 112, the sentry 214 may send the user portion 118 of the UMS thread 102 into the UMS completion list 202. At that time, the context information 210 of the user portion 118 may be extracted to a memory, such as the user stack 128. In some embodiments, a primary thread, such as the primary thread 106, may subsequently schedule another switch of the user portion 118 with the user portion 122 of a primary thread 106, so that the execution described above may be repeated again.

However, if the sentry 214 detects that the primary thread 106 has not exited kernel mode 112, the sentry 214 may not send the user portion 118 of the UMS thread 102 into the UMS completion list 202. Instead, in some embodiments, the UMS thread 102 may undergo the optimization described below with respect to FIG. 2f.

It will be appreciated that, while only a single primary thread 106 is depicted in the FIG. 2e, there may be one or more primary threads in the multi-processor environment 100. Accordingly, a primary thread other than the primary thread 106 may return to the user mode scheduler 204 in user mode 114. In turn, the user mode scheduler 204 may switch the primary thread's user portion 122 with the user portion 118 of UMS thread 102 that had been put on the completion list 202.

Figure 2F:
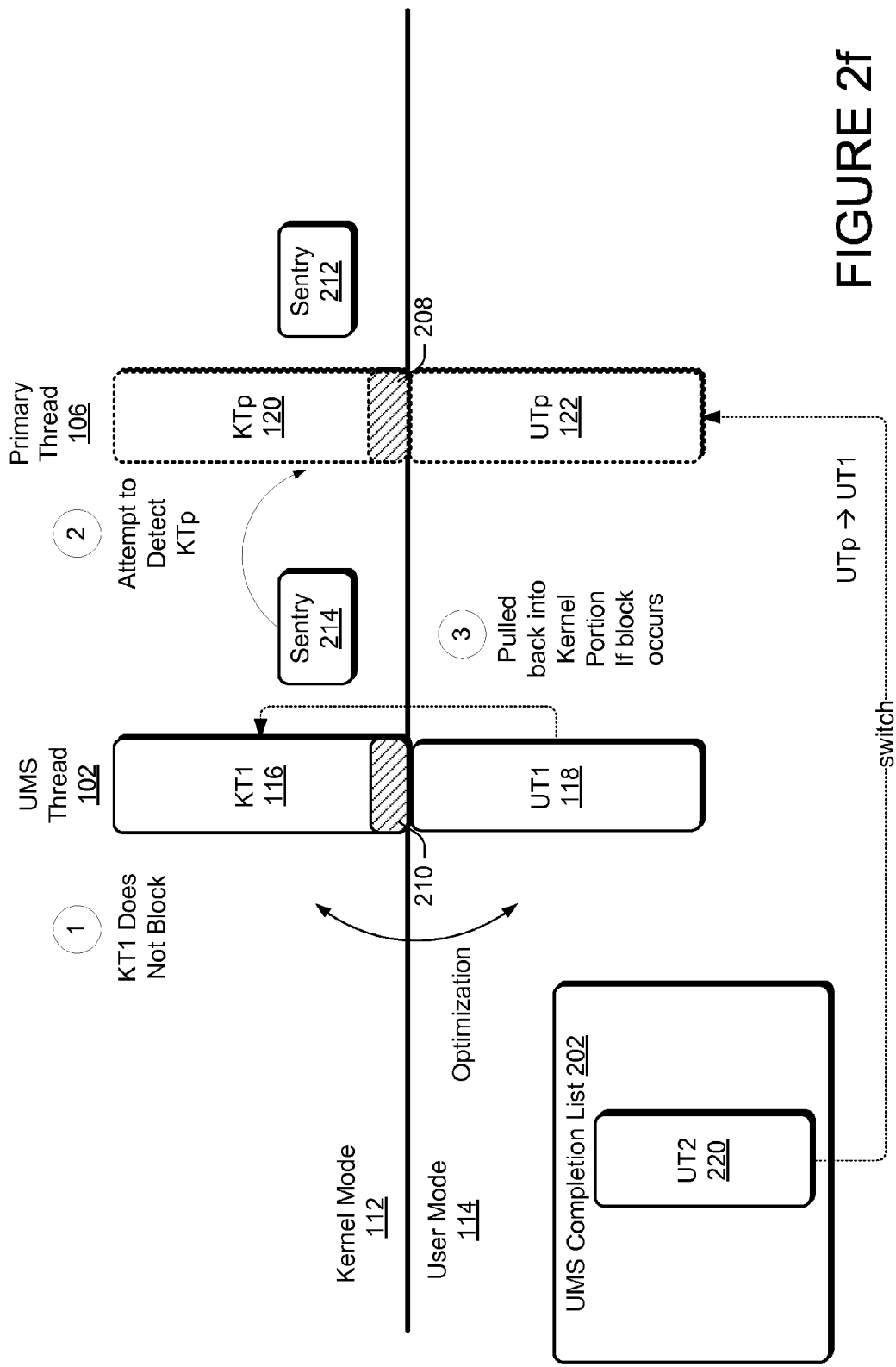

FIG. 2f illustrates the optimization of an UMS thread that is not blocked after a context switch where it copied context information from the primary thread. Alternatively, the optimization may also be performed on an UMS thread that becomes unblocked while the primary thread is still in kernel mode following the context switch. The optimization is illustrated in the context of primary thread 106 and the UMS thread 102. As described above, when the UMS thread 102 switches its context information 210 with the context information 208 of the primary thread 106, the primary thread 106 may be released to run another UMS thread.

As further described above, the UMS thread 102 is normally prevented from execution in user mode 114. In other words, the kernel portion 116 of the UMS thread 102 is normally prohibited from switching to its corresponding user portion 118. Instead, when the processing of the kernel portion 116 is completed, the user portion 118 of the UMS thread 102 is transferred to the UMS completion list 202 so that it may be picked up by the user mode scheduler 204 running on a primary thread. This is to avoid over subscribing the CPU resources on the system.

However, when the UMS thread 102 is not blocked in kernel mode 112 and the primary thread 106 is also still present in kernel mode 112 (after having been released after the context switch), the optimization described in FIG. 2f may allow the UMS thread 102 to enter user mode 114.

As shown, the sentry 214 may be configured to determine whether the primary thread 106 is still in kernel mode 112 in the event that the kernel portion 116 attempts to exit from kernel mode 112 to user mode 114. More specifically, the sentry 214 may check whether the kernel portion 116 of the primary thread 106 is still present in kernel mode 112 after it has been released after the context switch. If that is the case, the sentry 214 may permit the UMS thread 102 to exit into user mode 114 and perform operations via its user portion 118. In essence, the UMS thread 102 is permitted to act as a standard thread, such as the standard thread 110. Otherwise, the sentry 214 will not permit the UMS thread 102 to exit into user mode 114.

Furthermore, when the sentry 214 decides to deny permission for the UMS thread 102 to exit into user mode 114, the sentry 214 may place the user portion 118 into the UMS completion list 202. Also, the kernel portion 116 of the UMS thread 102 may "park" itself. Additionally, because the kernel portion 120 of the primary 106 is no longer in kernel mode 112, the primary thread 106 may have cleared its states, and switch to the user portion of another UMS thread, such as user portion 218, to execute in user mode 114.

When the UMS thread 102 exits to user mode 114, the UMS thread 102 is nevertheless susceptible to being blocked. However, the UMS thread 102 may only be blocked in kernel mode 112. Thus, if the UMS thread 102 is to be blocked while it is in user mode 114 (e.g., in response to a page fault, a system call, etc.), the UMS thread 102 may re-enter kernel mode 112. Moreover, such a blocking action will also release the primary thread 106 from its association with the UMS thread 102, if the primary thread 106 was not previously released.

Once the UMS thread 102 re-enters kernel mode 112, the UMS thread 102 may be subject to the same check by the sentry 214 when it once again attempts to exit from kernel mode 112 to user mode 114. As described above, the outcome of this check is either the UMS thread 102 being permitted to exit into user mode 114 (if primary thread 106 is still present in kernel mode 112), or the user portion 118 of the UMS thread 102 being queued to the UMS completion list (if primary thread 106 is not present in kernel mode 112). It will be appreciated that during the optimization described in FIG. 2f, the UMS thread 102 may freely move back and forth between kernel mode 112 and user mode 114 to carry out processing, so long as the primary 106 is present in kernel mode 112. This avoids the repeated cost of directed switch if the UMS thread is generally performing non-blocking work.

Figure 2G:
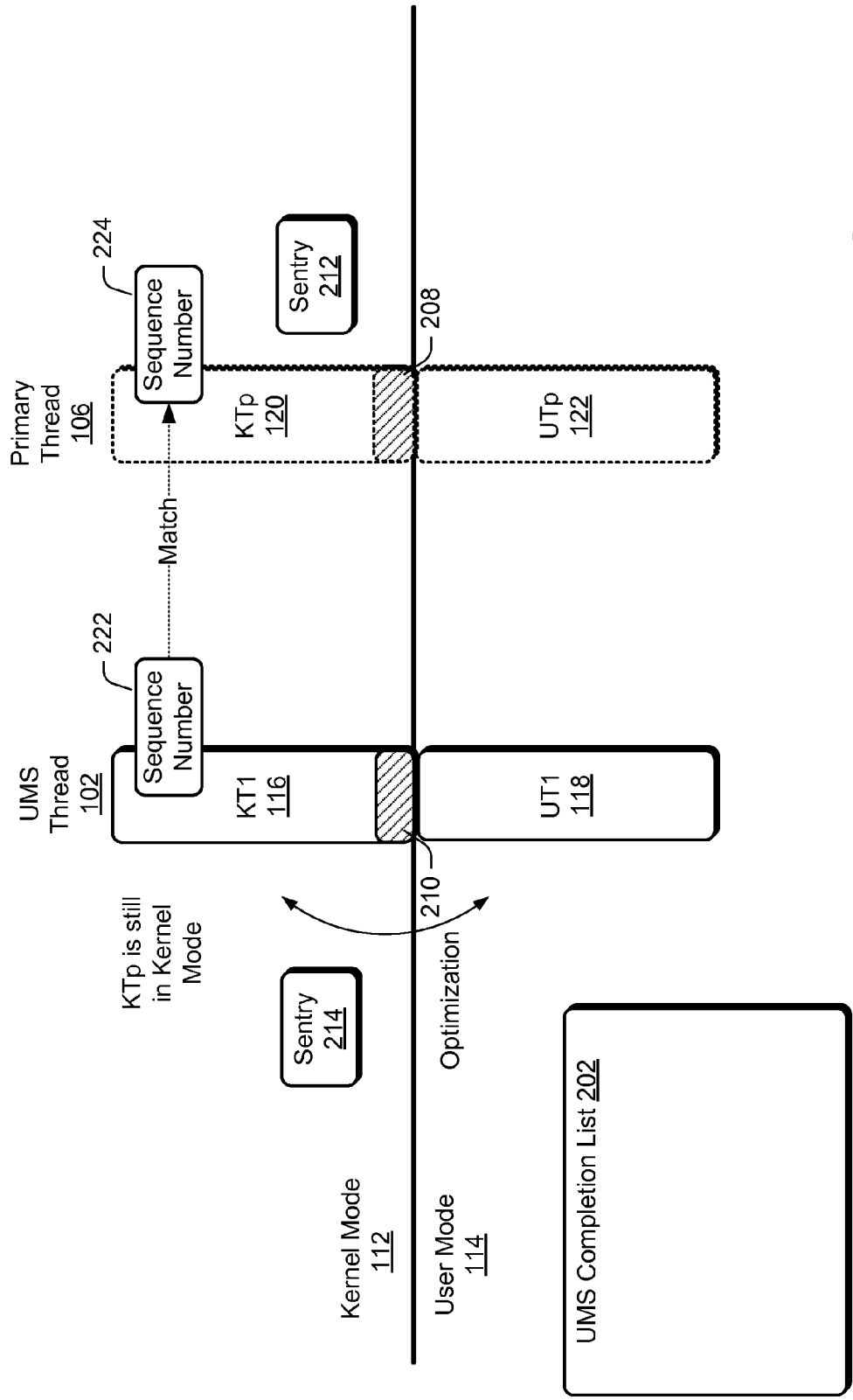

FIG. 2g illustrates embodiments where the sentry 214 may perform another version of the check that determines whether the primary thread 106 is still in kernel mode 112. It will be appreciated that the primary thread 106 may be in kernel mode 112 under two different scenarios. First, the primary thread 106 may be in kernel mode 112 when it has not had the opportunity to exit kernel mode 112 to execute another UMS thread, such as UMS thread 102. Second, the primary thread 106 may be in kernel mode 112 because it has already exited kernel mode 112, picked up another UMS thread for execution via context switch, and is back in kernel mode 112.

Thus, in order to ensure that the primary thread 106 is in kernel mode 112 under the first scenario and not the second scenario, the sentry 214 may check a thread sequence number 222 given to the kernel portion 116 of the UMS thread 102 against a thread sequence 224 that is given to the kernel portion 116 of the primary thread 106. In various embodiments, if the thread sequence number 222 matches the thread sequence number 224, then the sentry 214 may permit the UMS thread 102 to enter into user mode 114 and perform operations via its user portion 118. However, if the thread sequence number 222 does not match the thread sequence number 224, the sentry 214 will not permit the UMS thread 102 to enter into user mode 114. It will be appreciated that it is not an incorrect behavior if the UMS thread 102 enters into user mode 114 when the sequence numbers 222 and 224 does not match. However, such an occurrence would not be the best mode of operation as an extra thread will be running on the multi-processor environment 100.

Figure 3A:
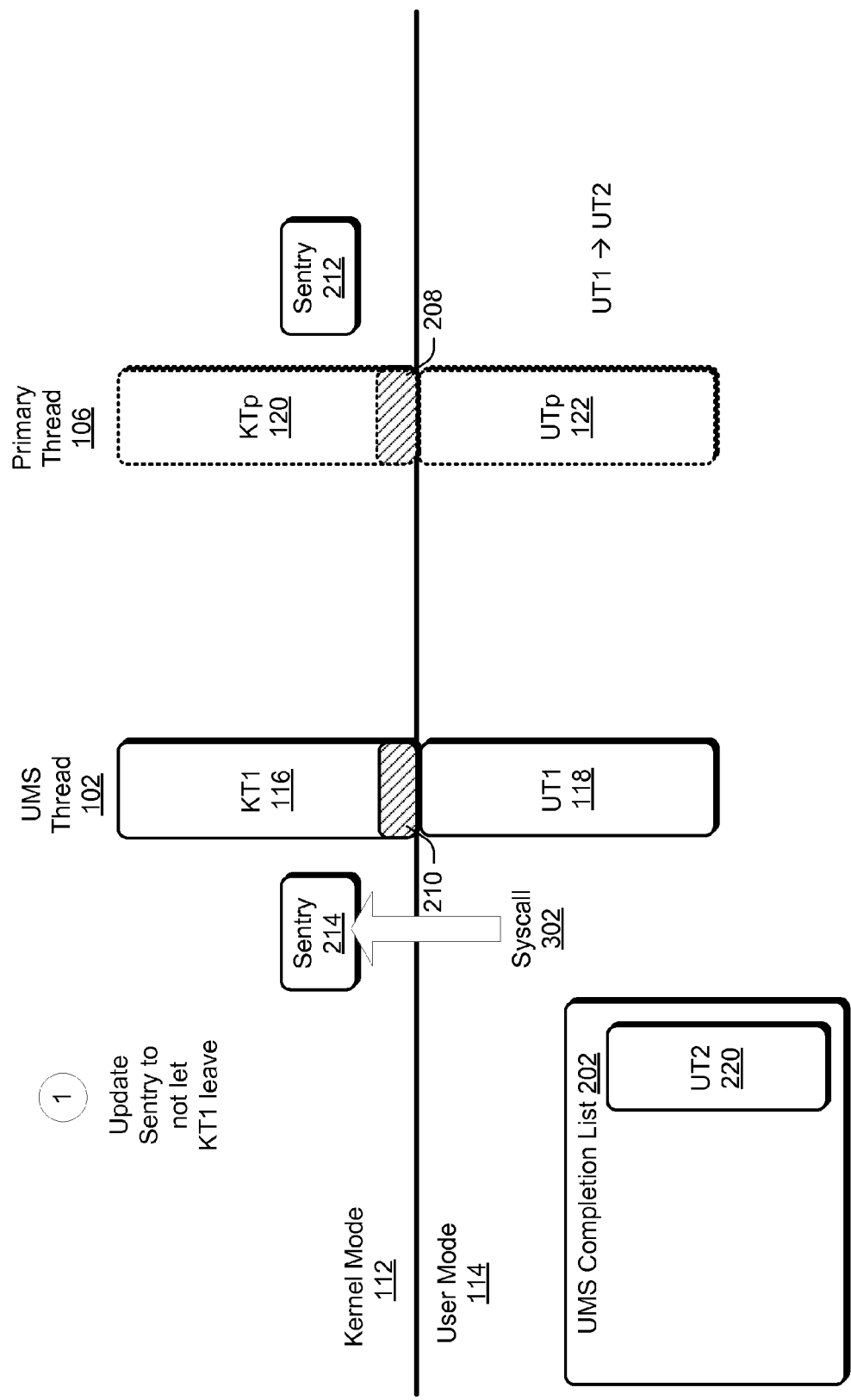
FIGS. 3a-3b are block diagrams illustrating an exemplary optimization of a directed switch between a user mode schedulable (UMS) thread and a primary thread of a central processing unit (CPU), in accordance with various embodiments.
Figure 3B:
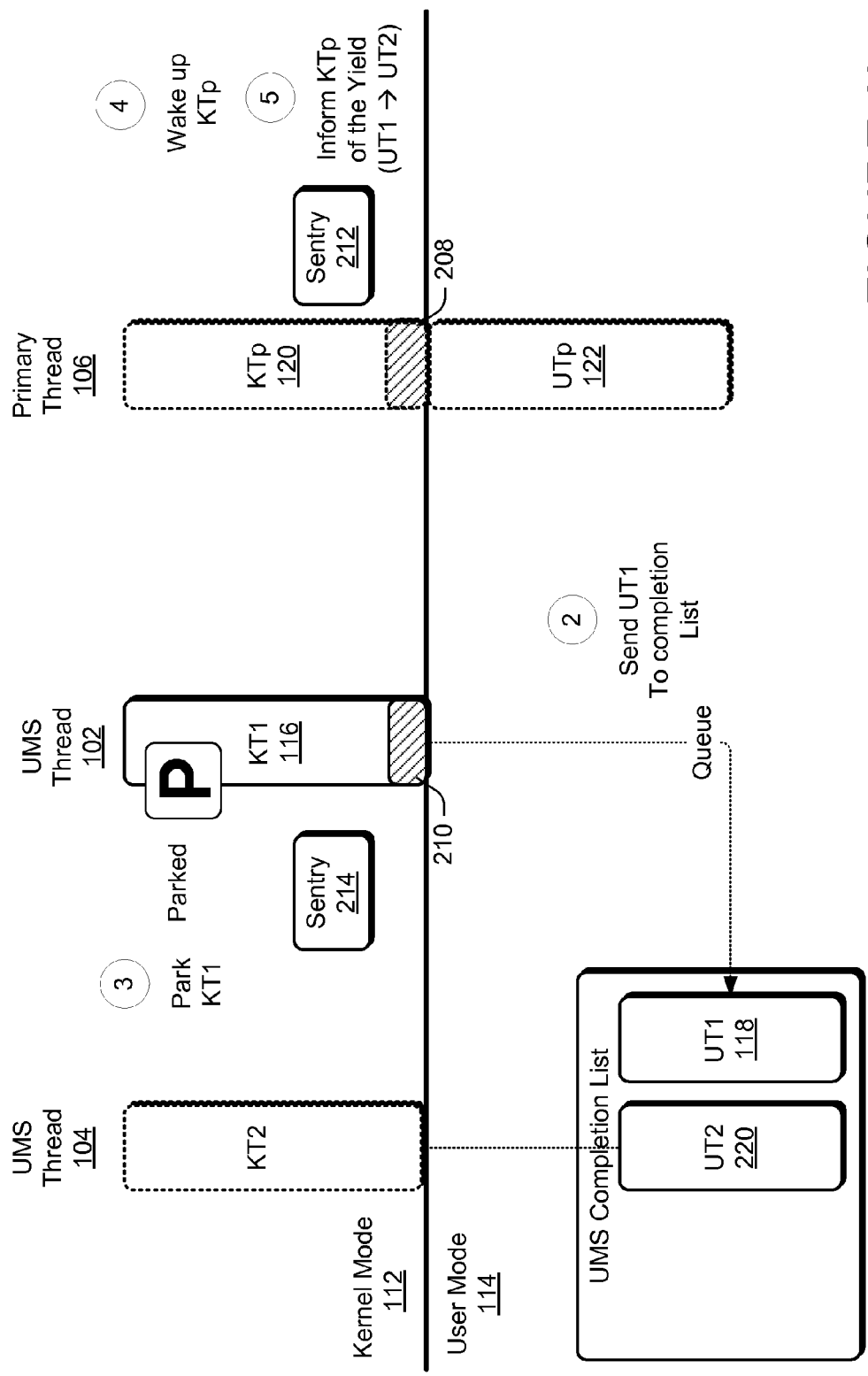

FIGS. 3a and 3b are block diagrams illustrating an exemplary optimization of a directed switch between a UMS thread and a primary thread, in accordance with various embodiments. This optimization may be performed after a user portion of a primary thread has switched to the user portion of a UMS thread to execute the UMS thread. Once the primary thread executes on behalf of the UMS thread, the UMS thread may voluntarily disassociate itself from the primary thread in user mode. In this way, the primary thread may execute another UMS thread. In various embodiments, such a voluntary dissociation may be referred to as an "UMS yield" operation.

Moreover, if the UMS thread completes kernel mode execution without blocking and continues to execute the user portion of UMS thread, the UMS thread may then perform a voluntary disassociate operation to revert to the primary thread in user mode. Since the yield operation is executing on the UMS thread in user mode, the yield operation requires assistance from the OS kernel. Accordingly, such a voluntary yield may be referred to as a "kernel assisted yield," and may be made by the UMS thread running its user portion as the UMS thread enters a co-operative yield point. It will be appreciated that the "kernel assisted yield" is necessary for the proper operation of the UMS thread. Otherwise, the kernel portion of the UMS thread may begin to behave like a primary thread (i.e., it will be executing the user portion of other threads). This may pose a difficulty for some embodiments as it is expected when the user portion enters kernel mode on some kernel thread, that the kernel portion of the user thread is available for a directed switch.

The "kernel assisted yield" is illustrated in the context of primary thread 106 and the UMS thread 102. As shown in FIGS. 3a and 3b, the "kernel assisted yield" may occur after the primary thread 106 has switched to the UMS thread 102, the UMS thread 102 has replaced its own context information 210 with the context information 208 of the primary thread 106, and the primary thread 106 has been suspended and released from its association with the UMS thread 102. As described above, these steps are performed after the primary thread 106 has entered into kernel mode 112, so that the kernel portion 120 of the primary thread 106 may be switched with the kernel portion 116 of the UMS thread 102 for proper execution.

FIG. 3a illustrates a scenario where the application has directed the UMS thread 102 to voluntarily yield to a UMS thread 110. As shown in FIG. 3a, a special system call 302 may be made by the application to the sentry 214. The special system call 302 is configured to command the sentry 214 to prevent the UMS thread 102 from exiting from kernel mode 112 into user mode 114 even if the kernel portion 120 of the primary thread 106 is present in kernel mode 112.

Thus, as shown in FIG. 3b, when the UMS thread 102 attempts to exit from kernel mode 112, the sentry 214 will block the kernel portion 116 of the UMS thread 102 from exiting into user mode 114, thereby causing the kernel portion 116 to park, that is, enter into a waiting state. Moreover, the sentry 214 will also move the user portion 118 of the UMS thread 102 to the UMS completion list 202. In certain instances, the blocking of the kernel portion 116 will cause the kernel queues 218 to wake up the primary thread 106 from its blocked state if it is not already awake.

When the primary thread 106 wakes up, the kernel portion 116 of the UMS thread 102 will inform the primary thread 106 that it should pick up UMS thread 102 for execution. This information is passed from the kernel portion 116 to the primary thread 106 because the UMS thread 102 is voluntarily yielding to the UMS thread 102.

Accordingly, the kernel portion 116 of the primary thread 106 may clear itself of the register states that are associated with the UMS thread 102. Subsequently, the primary thread 106 may return to user mode 114, and pick up the UMS thread 104 (e.g., switch its user portion 122 with a user portion 220 of the UMS thread 104) for execution.

Figure 4:
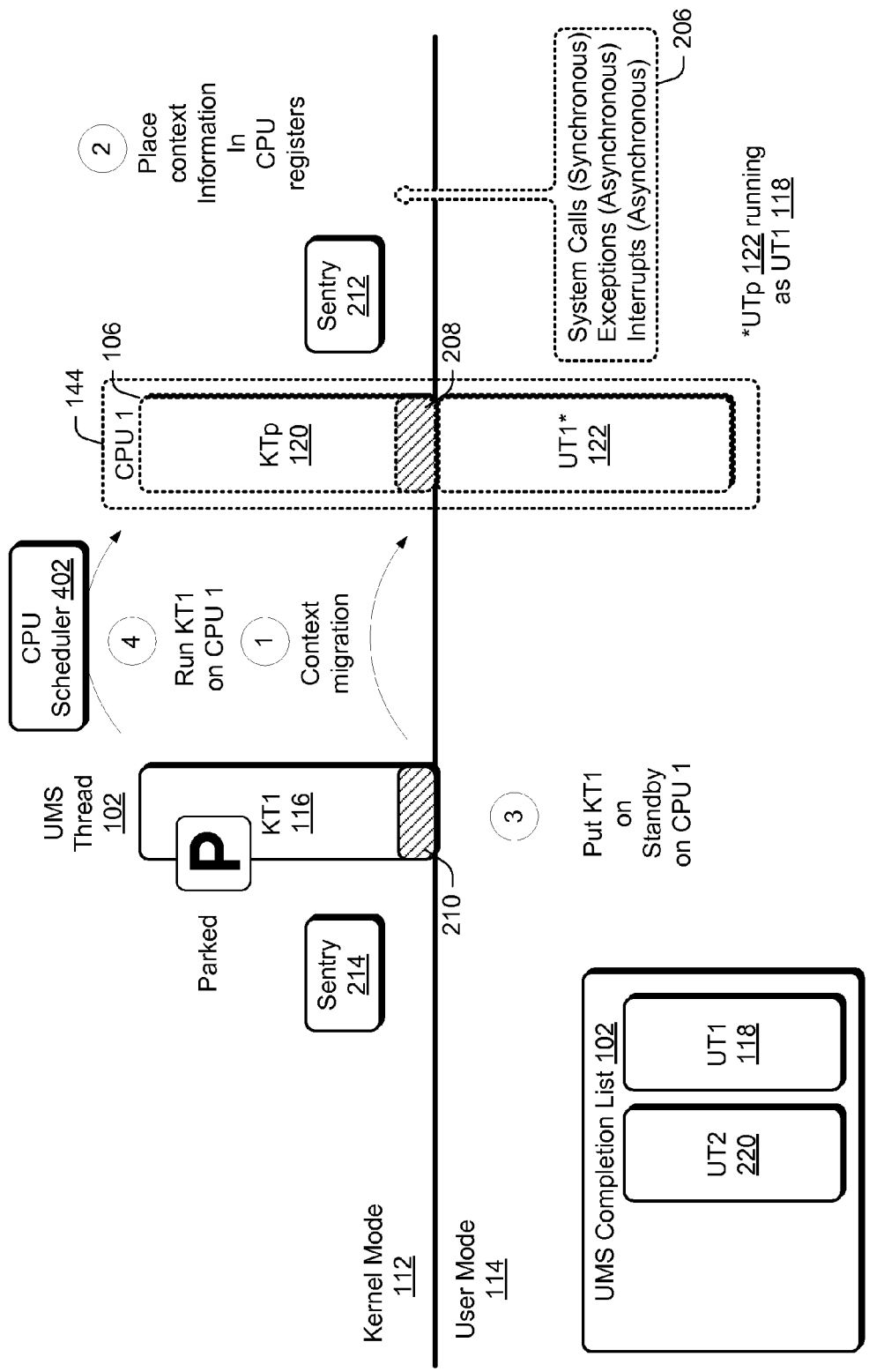
FIG. 4 illustrates an optimization that minimizes the steps performed in a directed switch by scheduling a primary thread and a user mode schedulable (UMS) thread to execute in sequence, in accordance with various embodiments.

FIG. 4 illustrates a further optimization that minimizes the steps performed in a directed switch, in accordance with various embodiments. This optimization is illustrated in the context of primary thread 106 and the UMS thread 102. The optimization may occur after the user portion 122 of the primary thread 106 has switched with the user portion 118 of the UMS thread 102, and the primary thread 106 has entered into kernel mode 112 for processing. As shown, the UMS thread 102 may replace its own context information 210 with the context information 208 of the primary thread 106, as present in the CPU 144, in a context migration. However, the performance of the context migration may result in certain efficiencies. For example, an idle processor may be chosen for executing the user portion 118 of the UMS thread 102 after the context migration. The selection of an idle processor may lead to an inter-processor interrupt. Moreover, the caches of the idle processor may not be ready for the immediate execution of the UMS thread 102.

Thus, when the user mode scheduler 204 determines that such inefficiencies may result, the user mode scheduler 204 may perform the optimization. The optimization may cause the CPU 144 to execute the UMS thread 102 while the CPU 144 still retains the context information 208 of the primary thread 106.

In various embodiments, the primary thread 106 may notify the UMS thread 102 to place itself on standby for the CPU 144. The CPU 144 may be configured to be ready to execute the primary thread 106 while the context information 208 of the primary thread 106 is in the cache of the CPU 144. For example, the UMS thread may queue itself as the next item in a list of threads to be executed by the CPU. Accordingly, once the primary thread 106 has blocked itself, a CPU scheduler 402 may cause the CPU 144 to execute the UMS thread 102 using the context information 308 of the primary thread 106. In some embodiments, the CPU scheduler 402 and/or another verification mechanism may verify that the "affinity" of primary thread 106 and the "affinity" of the UMS thread 102 have a non-zero intersection. The affinity of a thread determines what CPUs the thread may be scheduled on by the CPU scheduler 402. So in other words, the verification mechanism may ensure that the UMS thread 102 is executed after the primary thread 106 only if such an execution sequence will not cause execution conflicts. In at least one embodiment, the CPU scheduler 402 may be the user mode scheduler 204.

Figure 5:
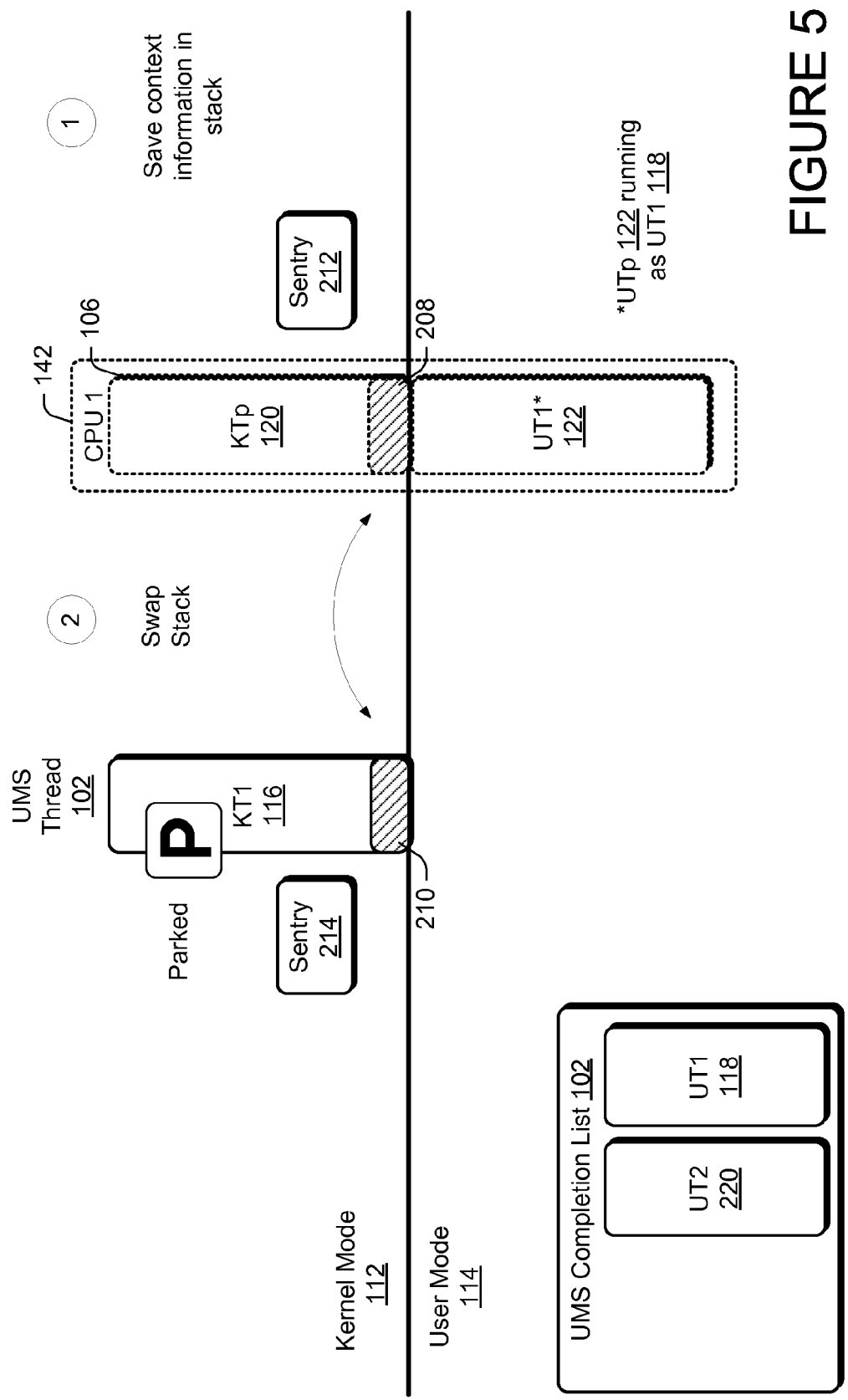
FIG. 5 illustrates an optimization of a directed switch that involves swapping stacks, in accordance with various embodiments.

FIG. 5 illustrates a further optimization of a directed switch that involves swapping stacks, in accordance with various embodiments. The optimization may occur after the user portion 122 of the primary thread 106 has switched to the user portion 118 of the UMS thread 102, and the kernel portion 120 of primary thread 106 has entered into kernel mode 112 for processing while running on a CPU, such as CPU 144. In various embodiments, instead of the UMS thread 102 replacing its own context information 210 with the context information 208 of the primary thread 106, the optimization may involve the trading the stacks. Specifically, the optimization involves the swapping of a stack of the primary thread 106, where the context information 210 is stored, with a stack of the UMS thread 102, where the context information 208 is stored. In at least one embodiments, the swapping of the stacks may be accomplished by providing a pointer to the location of the context information 210 to the UMS thread 102, and providing a pointer to the location of the context information 208 to the primary thread 106. In this way, the context information 210 and context information 208 may be swapped. Following the swap, the kernel portion 116 of UMS thread 102 may continue to be executed by the CPU 144.

Exemplary Components

Figure 6:
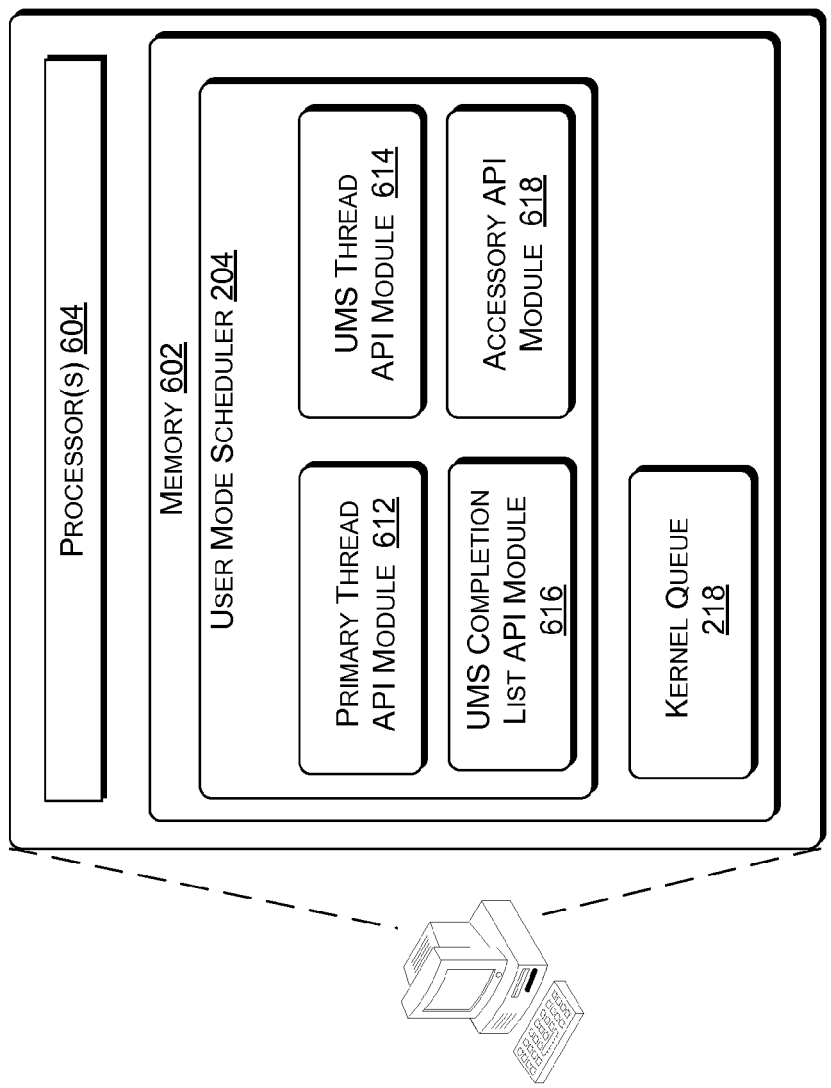
FIG. 6 is a block diagram illustrating selected components of a multi-processor environment that implements a directed switch, in accordance with various embodiments.

FIG. 6 illustrates selected components of a multi-processor environment 100. The selected components may include computer-program instructions being executed by a computing device, such as the computing device 1200 described in FIG. 12. The selected components may be stored in memory 602 and act on one or more processors 604. The memory 602 may include volatile and nonvolatile memory, removable and non-removable media implemented in any method or technology for storage of information, such as computer-readable instructions, data structures, program modules or other data. Such memory may include, but is not limited to, random access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The selected components stored in memory 602 may in the form of program instructions. The program instructions, or modules, may include routines, programs, objects, components, and data structures that perform particular tasks or implement particular abstract data types. The modules may be implemented as software or computer-executable instructions that are executed by one or more processors 604. As shown in FIG. 6, the selected components may include a user mode scheduler 204, and a kernel queue 218. However, it will be appreciated that the environment may also include other modules that perform other functions related to thread execution.

The user mode scheduler 204 may be configured to create primary threads and manage UMS threads. The user mode scheduler 204 may be further responsible for exposing UMS thread mechanisms to higher level components in applications, and may also control and implement scheduling policies specific to an application and its instances that uses the threads. In various embodiments, the user mode scheduler 204 may be configured to select the next thread to run from among the user portions of UMS threads that are ready to execute, such as user portion 118 and switches the CPU to run the selected. In some embodiments, the user mode scheduler 204 may further perform the various optimization functions described above.

The user mode scheduler 204 may include a primary thread API module 612, a UMS thread API module 614, a UMS completion list API module 616, and an accessory API module 618. The primary thread API module 612 may be configured to enable an application to start a new instance of the user mode scheduler 204. The UMS thread API module 614 may be configured to create a new UMS thread, such as the UMS thread 102, from a standard process thread, such as the standard thread 110. In one at least one embodiments, the thread API module 614 may convert a standard thread into a new UMS thread by adding a special state or convert a standard thread into a primary thread and vice versa Moreover, the thread API module 614 may enable a primary thread to switch to a UMS thread. Additionally, the thread API module 614 may further enable a first UMS thread to yield to a second UMS thread by providing a hint to the primary thread, such as the primary thread 106, which indicates that the UMS thread should execute as a result of the yield. Finally, the thread API module 614 may be implemented to convert a UMS thread or a primary thread back into a standard thread with the removal of the special state. In some embodiments, the thread API module 614 may be further configured to handle the thread execution optimizations described in FIGS. 4 and 5.

The UMS completion list API module 616 may be configured to create and manage a UMS completion list, such as the UMS completion list 202. In other embodiments, the UMS completion list API module 616 may withdraw from the UMS completion list all queued UMS thread user portions. In additional embodiments, the UMS completion list API module 616 may be implemented to delete a UMS completion list.

The accessory API module 618 may be configured to fetch various UMS thread states. For example, the accessory API module 618 may fetch a UMS thread user portion from a UMS completion list so that it may be switched with a user portion of a primary thread for execution on a CPU. In various embodiments, the accessory API module 618 may obtain the latest queued UMS thread from the UMS completion list, as well as obtain the next queued UMS thread. In other embodiments, the accessory API module 618 may be further configured to provide each of the UMS threads with thread information, as well as retrieve thread information from each of the UMS threads.

Finally, the kernel queue 218 is a mechanism that may be configured to monitor system operations and registers events and notify appropriate components of changes. The kernel queue 218 may also used by the OS kernel to control the concurrency level of threads associated with a particular queue. In various embodiments, the kernel queues 610 may wake up the primary thread, such as the primary thread 106, when the user portion 118 of the UMS thread 102 enters into a "parked" state or otherwise blocks in kernel mode 112 (e.g., due to a synchronous wait in a system call or a page fault). This may be accomplished by ensuring that the kernel queues used with the UMS mechanism only allow a concurrency level of a single thread.

Exemplary Processes

FIGS. 7-10 illustrate exemplary processes that implement directed switch for user mode schedulable (UMS) threads, in accordance with various embodiments. The exemplary processes in FIGS. 7-11 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the exemplary multi-processor environment 100 of FIG. 1, although they may be implemented in other system architectures.

Figure 7:
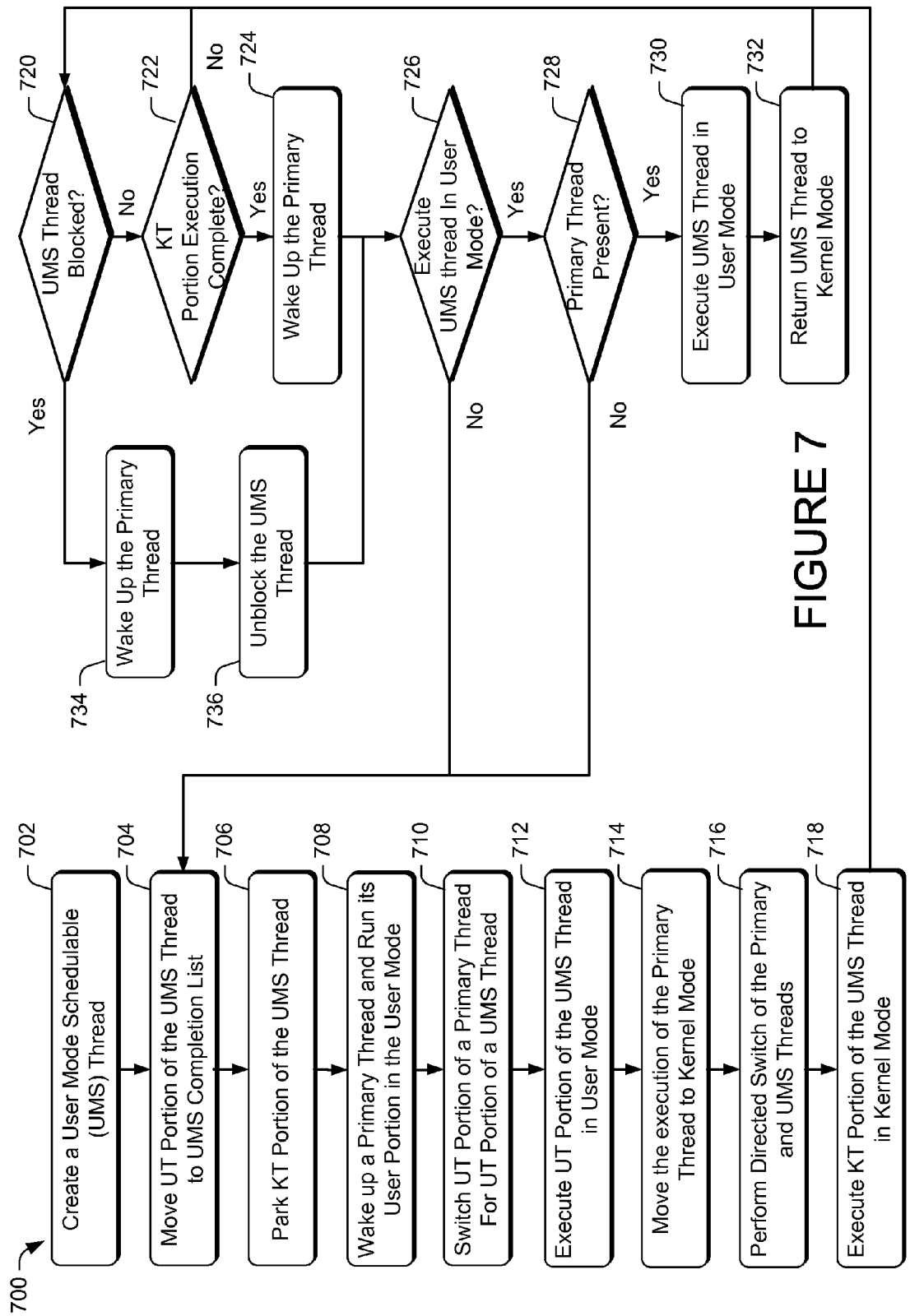
FIG. 7 is a flow diagram illustrating an exemplary process for implementing a directed switch, in accordance with various embodiments.

FIG. 7 is a flow diagram illustrating an exemplary process 700 for implementing a directed switch, in accordance with various embodiments. The description of process 700 may refer to embodiments in FIGS. 1-5.

At block 702, an application may create a user mode schedulable (UMS) thread, such as the UMS thread 102. In at least one embodiment involving the IA-64 (Itanium) CPU architecture, the UMS thread 102 may be created from a standard thread, such as the standard thread 110, with the use of the special pointer 140 to the states that are stored in a user thread descriptor of the UMS thread 102.

However, in other embodiments involving x86 and x64 CPU architectures, the UMS thread 102 may be created from a standard thread, such as the standard thread 100, with the use of a segment selector 142 that references the user thread descriptor of the UMS thread 102.

At block 704, once kernel side initialization of the UMS 102 is completed, the kernel portion 116 of the UMS thread 102 may direct a code algorithm running in kernel mode 112, such as the sentry 214, to move the user portion 118 of the UMS thread 102 to a UMS completion list 202.

At block 706, having directed the move of the user portion 118 to the UMS completion list 202, the kernel portion 116 of the UMS thread may enter into a "parked" state, that is, a type of waiting state.

At block 708, the parking of the UMS thread 102 may signal a kernel queue 218 to activate the primary thread 106, e.g., wake it up from a suspended state. An application may create a primary thread 106 from a standard thread, such as the standard thread 110, by the addition of a special state. Accordingly, primary threads such as thread 108 may be dynamically converted from and into standard threads as application requirements dictate. Once the kernel portion 120 of primary thread 106 wakes up it may switch to its user portion 122 in user mode 114. In various embodiments, the primary thread 106 may purge the context information 208 in its kernel portion 120 during wake up. The purging of the context information 208 may serve to ensure that it is ready to switch to and execute a newly assigned UMS thread.

At block 710, the user portion 122 of the primary thread 106 may be switched for a user portion of a UMS thread, such as one of the UMS threads that is queued in the UMS completion list 202. In some instances, the user portion 122 may be switched for the user portion 118 of the UMS thread 102. In at least one embodiment, the switch may be accomplished with the use of one of the special pointer 140 or segment selector 142. At block 712, the switch between the user portion 122 and the user portion 118 may enable the primary thread 106 to execute on behalf of the UMS thread 102 in user mode 114.

At block 714, once the user portion 118 has finished executing in user mode 114 and may need to move to kernel mode 112 in order to perform additional executions in its kernel portion 116.

At block 716, a directed switch may be performed between the UMS thread 102 and the primary thread 106. In various embodiments, the directed switch may be implemented with the replacement of the context information 210 in the UMS thread 102 with the context information 208 of the primary thread 106. Following the directed switch, the primary thread may be released from its association with the UMS thread 102. Subsequently, the UMS thread 102 may go into a blocked state. In at least one instance, the UMS thread may exit its blocked state when called upon by the user mode scheduler 204 to perform another execution.

At block 718, following the directed switch, the kernel portion 116 of the UMS thread 102 may be executed in kernel mode 112.

At decision block 720, the kernel queue 218 may determine whether the kernel portion 116 of the UMS thread 102 becomes blocked during execution. As long as the kernel queue 218 determines that the kernel portion 116 is not blocked ("no" at decision block 722), the process 700 may proceed to decision block 722.

At decision block 722, the kernel queue 218 may determine whether the kernel portion 116 of the UMS thread 102 has completed its kernel mode 112 execution on a CPU, such as CPU 144. If the kernel portion 116 did not complete its execution on the CPU ("no" at decision block 720), the process 700 may loop back to decision block 720. However, if the kernel queue 218 determines that the kernel portion 116 has completed its execution on the CPU ("yes" at decision block 722), the process 700 may proceed to block 724.

At block 724, the primary thread 106 may awake from its blocked state at block 732. During this awake state, the primary thread 106 may exit kernel mode 112 into user mode 114, where the user portion 122 of the primary thread 106 may execute the user mode scheduler 204 and switch to the user portion of another UMS thread, such as user portion 220, for execution. In various embodiments, the primary thread 106 may purge the context information 208 in its kernel portion 120 during wake up. The purging of the context information 208 may serve to ensure that it is ready to switch to and execute a newly assigned UMS thread.

At decision block 726, it may determined that whether an optimization, such as the optimization described in FIG. 2*f*, may be performed to enable the UMS thread 102 to enter user mode 114 for additional execution. As described above, the performance of this optimization may eliminate the repeated cost of directed switch if the UMS thread is generally performing non-blocking work. Thus, if the optimization is not to be performed ("no" at decision block 724), the process 700 may loop back to block 704, where the UT portion 118 of the UMS thread 102 may be moved to a UMS completion list 202.

However, if it is determined that the optimization is to be performed to enable the UMS thread 102 to enter user mode 114 for additional execution, ("yes" at decision block 724), the process 700 may proceed to block 728.

At decision block 728, the sentry 214 may detect that the UMS thread 102 is attempting to exit kernel mode 112. Accordingly, the sentry 214 may determine whether the primary thread 106 is still present in kernel mode 112. If the sentry 214 determines that the user portion 122 of the primary thread 106 is not present in kernel mode 112 ("no" at decision block 728), the process 700 may return to block 704. The user portion 122 of the primary thread 106 may have begun executing in user mode. Upon returning to block 704, the user portion 118 of the of the UMS thread 102 may be moved to the UMS completion list 204.

However, if the sentry 214 determines that the user portion 122 of the primary thread 106 had not yet returned to user mode 114 ("yes" at decision block 728), the sentry 214 may permit the UMS thread 102 to begin execution in user mode 114. In other words, the sentry 214 may allow the UMS thread 102 to act as a standard thread, such as standard thread 110, and implicitly begin running in user mode 114 without waiting to be chosen by the user mode scheduler 204.

At block 730, the user portion 118 of the UMS thread 102 may execute in user mode 114.

At block 732, the UMS thread 102 may return to kernel mode 112. In some embodiments, the UMS thread 102 may return to kernel mode 112 because its execution in user mode 114 is completed, so that additional processing of the UMS thread 102 in kernel mode 112 is performed. In other embodiments, the UMS thread 102 may return to kernel mode 112 because the UMS thread 102 encountered a blocking system call or page fault while its user portion 118 is executing in user mode 114. As described above, since the UMS thread 102 is only capable of handling a block or page fault in kernel mode 112, the process 700 may loop back to block 720 to return to kernel mode 112.

Return to block 720, if the OS kernel determines that the kernel portion 116 of the UMS thread 102 is blocked ("yes" at decision block 720), the primary thread 106 may awake from its blocked state at block 734. During this awake state, the primary thread 106 may exit kernel mode 112 into user mode 114, where the user portion 122 of the primary thread 106 may execute the user mode scheduler 204 and switch to the user portion of another UMS thread, such as user portion 220, for execution. In various embodiments, the primary thread 106 may purge the context information 208 in its kernel portion 120 during wake up. The purging of the context information 208 may serve to ensure that it is ready to switch to and execute a newly assigned UMS thread.

At block 736, the kernel portion 116 of the UMS thread 102 may become unblocked. For example, but not as a limitation, a blocking event may time out, or the block may become unnecessary. When the kernel portion 116 of the UMS thread 102 becomes unblocked, the process 700 may proceed to block 726, where the process 700 will further progress as previously described.

Figure 8:
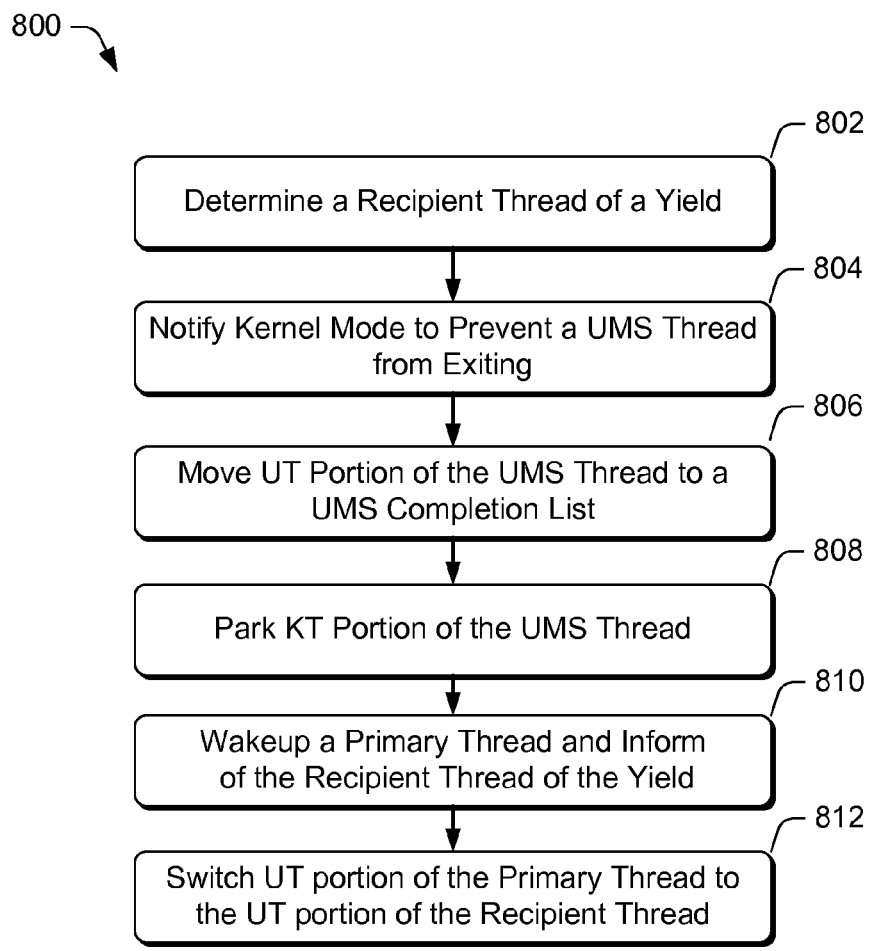
FIG. 8 is a flow diagram illustrating an exemplary process for implementing a kernel assisted yield in conjunction with a directed switch, in accordance with various embodiments.

FIG. 8 is a flow diagram illustrating an exemplary process 800 for implementing a kernel assisted yield in conjunction with a directed switch, in accordance with various embodiments.

At block 802, an application may determine that a particular UMS thread, such as the UMS thread 102, will yield to another UMS thread, such as the UMS thread 102, during a directed switch. In other words, a recipient UMS thread may be determined for the yield.

At block 804, the application may make a system call to kernel mode to prevent the UMS thread 102 from exiting kernel mode 112. In one embodiment, the system call is directed to the sentry 214.

At block 806, when the UMS portion 116 of the UMS thread 102 attempts to exit to user mode 114, the sentry 214 may move the user portion 118 of the UMS thread 102 to the UMS completion list 204. Subsequently, at block 808, the kernel portion 116 of the UMS thread 102 may "park" itself, that is, enter into a waiting state.

At block 810, the kernel queue 220 may detect that the UMS thread 102 has entered into the "parked" state and wake up the primary thread 106. The kernel portion 116 of the UMS thread 102 may inform the primary thread 106 that it has yielded to the UMS thread 102.

At block 812, the primary thread 106 may execute the UMS thread 102. In at least one embodiment, the primary thread 106 may switch its user portion 122 with the user portion of the UMS thread 102.

Figure 9:
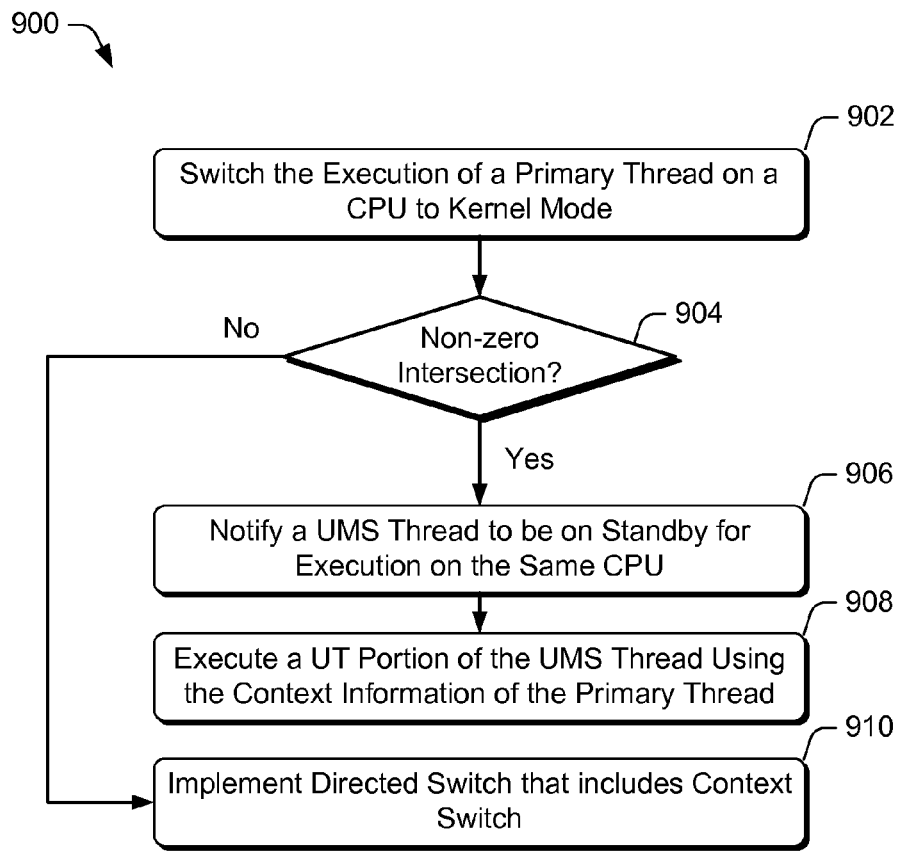
FIG. 9 is a flow diagram illustrating an exemplary optimization process that minimizes the steps performed in a directed switch by scheduling a primary thread and a user mode schedulable (UMS) thread to execute in sequence, in accordance with various embodiments.

FIG. 9 is a flow diagram illustrating an exemplary optimization process 900 that minimizes the steps performed in a directed switch by scheduling a primary thread and a UMS thread to execute in sequence, in accordance with various embodiments. At block 902, the execution of a primary thread on a CPU, such as the primary thread 106, is switch from user mode 114 to kernel mode 112. In at least one embodiment, the CPU may be the CPU 144 described in FIG. 1. At the time of the switch, the primary thread 106 may be running the user portion 118 of the UMS thread 102.

At decision block 904, a checking mechanism, such as the user mode scheduler 204, may make a determination as to whether the affinity of the primary thread 106 and the affinity of the UMS thread 102 shares a non-zero intersection. In at least one embodiment, the sharing of non-zero intersection indicates that the execution of the primary thread 106 and the UMS thread 102 on the same CPU 144 will not cause conflicts. If the user mode scheduler 204 determines that the affinities of the primary thread 106 and the UMS thread 102 shares a non-zero intersection ("yes" at decision block), the process 1000 may proceed to block 906.

At block 906, the primary thread 106 may notify the UMS thread 102 to be on standby for execution on the same CPU that is executing the primary thread 106.

At block 908, while the context information 208 of the primary thread 106 is in a memory cache of the CPU, the user portion 118 of the UMS thread 102 may be executed using the context information 208. Thread priorities are also adjusted to ensure the sequential execution is not a violation of the general thread prioritization rules observed by the kernel thread scheduler. For example, the thread priority on the target UMS thread (kernel portion) may be boosted to equal that of the incoming primary, as appropriate. Thus, the sequential execution of the kernel portion 116 of the UMS thread 102 following the execution of the user portion 122 on the same CPU may eliminate the need to perform a full context switch of the context information 208 with the context information 210 of the UMS thread 102 that may involve signaling another CPU to run the thread. However, if the user mode scheduler 204 determines that the that the affinities of the primary thread 106 and the UMS thread 102 do not shares a non-zero intersection ("no" at decision block), the process 900 may proceed to block 910.

At block 910, the primary thread 106 and the UMS thread 102 may implement a directed switch that includes the context switch of the context information 208 with the context information 210 of the UMS thread 102, as described above.

Figure 10:
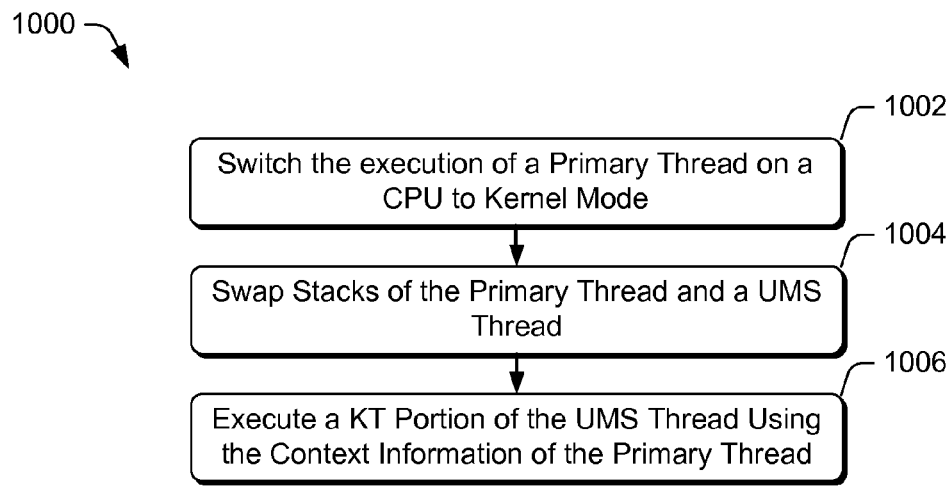
FIG. 10 is a flow diagram illustrating an exemplary optimization process that minimizes the steps performed in a directed switch via stack swaps, in accordance with various embodiments.

FIG. 10 is a flow diagram illustrating an exemplary optimization process 1000 that further minimizes the steps performed in a directed switch of a directed switch that involves swapping stacks, in accordance with various embodiments. At block 1002, the execution of a primary thread on a CPU, such as the primary thread 106, is switched from user mode 104 to kernel mode 112. In at least one embodiment, the CPU may be the CPU 144 described in FIG. 1.

At block 1004, the kernel stacks of the primary thread 106 and the UMS thread 102, respectively, may be swapped. For example, the kernel stack of the primary thread 106 may include the context information 208, and the kernel stack of the UMS thread 102 may include the context information 210. In various embodiments, the kernel stacks may be swapped by a mechanism that swaps the stack pointers of the respective kernel stacks.

At block 1006, the user portion 118 of the UMS thread 102 may be executed using the context information 208.

Exemplary Computing Device

Figure 11:
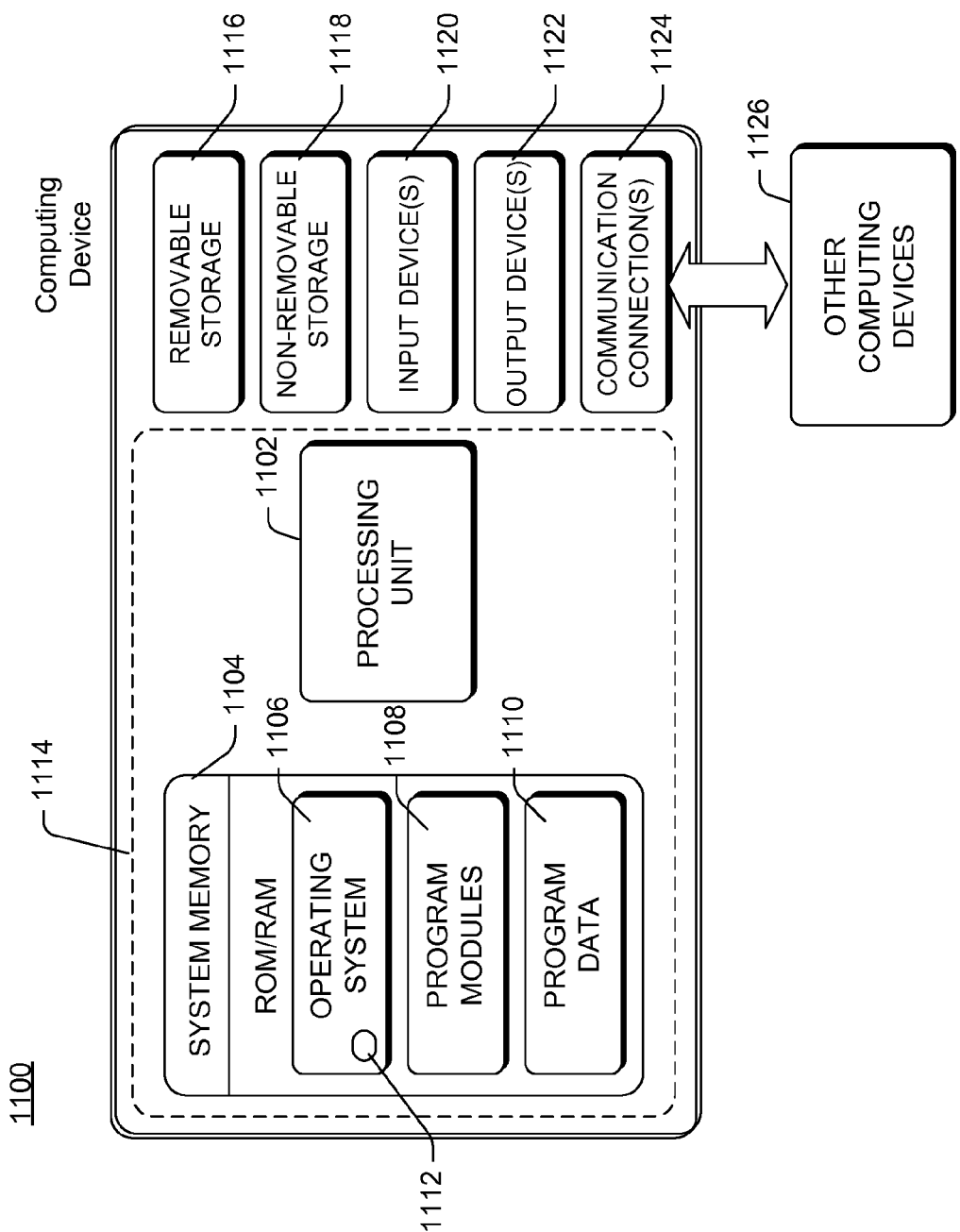
FIG. 11 is a block diagram illustrating a representative computing device. The representative device may be a part of a multi-processor environment, in accordance with various embodiments.

FIG. 11 illustrates a representative computing device 1100 that may be used to implement the directed switch and directed switch optimization techniques and mechanisms described herein. For example, the multi-processor environment 100 (FIG. 1) may be implemented on the representative computing device 1100. However, it is readily appreciated that the various embodiments of the directed switch techniques and mechanisms may be implemented in other computing devices, systems, and environments. The computing device 1100 shown in FIG. 11 is only one example of a computing device and is not intended to suggest any limitation as to the scope of use or functionality of the computer and network architectures. Neither should the computing device 1100 be interpreted as having any dependency or requirement relating to any one or combination of components illustrated in the example computing device.

In a very basic configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination of the two. System memory 1104 typically includes an operating system 1106, one or more program modules 1108, and may include program data 1110. The operating system 1106 include a component-based framework 1112 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 1100 is of a very basic configuration demarcated by a dashed line 1114. Again, a terminal may have fewer components but will interact with a computing device that may have such a basic configuration.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1116 and non-removable storage 1118. Computer storage media may include volatile and nonvolatile, removable and non-removable media implemented in any method or technology for storage of information, such as computer readable instructions, data structures, program modules, or other data. System memory 1104, removable storage 1116 and non-removable storage 1118 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of device 1100. Computing device 1100 may also have input device(s) 1120 such as keyboard, mouse, pen, voice input device, touch input device, etc. Output device(s) 1122 such as a display, speakers, printer, etc. may also be included. These devices are well known in the art and are not discussed at length here.

Computing device 1100 may also contain communication connections 1124 that allow the device to communicate with other computing devices 1126, such as over a network. These networks may include wired networks as well as wireless networks. Communication connections 1124 are one example of communication media. Communication media may typically be embodied by computer readable instructions, data structures, program modules, etc.

It is appreciated that the illustrated computing device 1100 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The use of directed switches for primary threads and the UMS thread, in conjunction with pure user mode context switches and completion ports for thread notifications, may provide an architecture and/or platform for applications, such as high performance enterprise applications, to better control thread execution and concurrency. Moreover, the use of directed switches on a multi-processor platform may enable applications to scale efficiently. With the use of directed switches and optimizations described herein, applications may have the ability to utilize all system services and/or application programming interface (API) on UMS threads transparently, that is, in the same manner as standard NT threads without compatibility issues.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

We claim:

1. A method, comprising:
switching a primary user portion of a primary thread to a user mode schedulable (UMS) user portion of a UMS thread in a user mode, each of the primary thread and the UMS thread including a corresponding user portion for execution in the user mode and a corresponding kernel portion for execution in a kernel mode;
executing the UMS user portion of the UMS thread via the primary user portion in the user mode;
transferring the primary thread into the kernel mode via an implicit switch; and
executing a UMS kernel portion of the UMS thread in the kernel mode using current context information of a primary kernel portion of the primary thread.

2. The method for of claim 1, further comprising creating the UMS thread from a NT thread.

3. The method of claim 1, further comprising:
creating the UMS thread portion from a NT thread;
moving the UMS user portion of the UMS thread into a UMS completion list; and
parking the UMS kernel portion of the UMS thread into a waiting state.

4. The method of claim 1, further comprising creating the primary thread from an additional UMS thread.

5. The method of claim 1, wherein the switching includes switching a user thread descriptor of the primary user portion to the user thread descriptor of a UMS user portion via one of a pointer or a segment selector.

6. The method of claim 1, wherein the executing includes pulling the current context information of the primary kernel portion into the UMS kernel portion via a pointer, and replacing old context information of the UMS kernel portion with the current context information of the primary kernel portion.

7. The method of claim 1, wherein the executing includes swapping a first stack of the primary kernel portion with a second stack of a UMS kernel portion, each of the stacks including the context information of each respective thread.

8. The method of claim 1, wherein the executing includes executing the UMS kernel portion on a CPU while the CPU retains the current context information of the primary user portion in its cache if a first affinity of the primary thread and a second affinity of the first UMS thread share a non-zero intersection.

9. The method of claim 1, further comprising:
moving the UMS user portion of the UMS thread into a UMS completion list; and
parking the UMS kernel portion of the first UMS thread into a waiting state;
clearing the states of the primary kernel portion of the primary thread;
transferring the primary thread from the kernel mode to the user mode via another implicit switch; and
executing one of the UMS thread and another UMS in the user mode.

10. A computer readable memory storing computer-executable instructions that, when executed, cause one or more processors to perform acts comprising:
switching a first user portion of a primary thread to a second user portion of a first user mode schedulable (UMS) thread in a user mode, each of the primary thread and the UMS thread including a corresponding user portion for execution in the user mode and a corresponding kernel portion for execution in a kernel mode, the corresponding user portion and kernel portion of the UMS thread being independently managed by an application, while the corresponding user portion and kernel portion of the primary thread are managed in unison by the application;
executing the first user portion in place of the second user portion in the user mode;
transferring a primary thread into the kernel mode by moving execution from the first user portion to a first kernel portion of the primary thread;
replacing first context information of a second kernel portion of the UMS thread with second context information of the first kernel portion; and
executing the first kernel portion in the kernel mode using the second context information.

11. The computer readable memory of claim 10, the computer-executable instructions causing the one or more processors to perform acts further comprising:
suspending the first kernel portion following the replacement of the first context information with the second context information; and
waking the first kernel portion from suspension when a second kernel portion of the UMS thread becomes blocked in a waiting state.

12. The computer readable memory of claim 10, the computer-executable instructions causing the one or more processors to perform acts further comprising:
permitting the primary thread to exit the kernel mode via an implicit switch from the first kernel portion to the first user portion; and
performing an implicit switch from the second kernel portion to the second user portion to execute the first UMS thread in the user mode when the primary thread has not exited the kernel mode.

13. The computer readable memory of claim 10, the computer-executable instructions causing the one or more processors to perform acts further comprising blocking the UMS thread in the kernel mode when the UMS thread is executing in the kernel mode or the user mode.

14. The computer readable memory of claim 10, the computer-executable instructions causing the one or more processors to perform acts further comprising:
determining an additional UMS thread to receive a yield from a UMS thread when the UMS thread exits to the user mode from the kernel mode;
moving the second user portion of the UMS thread into a UMS completion list;
parking the first kernel portion of the UMS thread in a waiting state; and
transferring the primary thread from the kernel mode to the user mode; and
executing a third user portion of the additional UMS thread in the user mode, the third user portion being retrieved from the UMS completion list.

15. The computer readable memory of claim 10, the computer-executable instructions causing the one or more processors to perform acts further comprising creating the UMS thread from a NT thread; and
creating the primary thread from a third thread.

16. The computer readable memory of claim 10, wherein the executing includes pulling current context information of the first kernel portion into the second kernel portion via a pointer, and replacing old context information of the second kernel portion with the current context information of the first kernel portion.

17. The computer readable memory of claim 10, wherein the executing includes swapping a first kernel portion stack with a second kernel portion stack, each of the stacks including the context information of each respective thread.

18. A system, comprising:
a user mode scheduler to switch a primary user portion of a primary thread to a user mode schedulable (UMS) user portion of a UMS thread to execute the UMS user portion via the primary user portion in a user mode, each of the primary thread and the UMS thread including a corresponding user portion for execution in the user mode and a corresponding kernel portion for execution in a kernel mode;
an implicit switch component to transfer the primary thread into the kernel mode; and
a central processing unit (CPU) to execute a UMS kernel portion of the UMS thread in the kernel mode using current context information of a primary kernel portion of the primary thread.

19. The system of claim 18, further comprising a pointer that enables the UMS kernel portion to pull the current context information of the primary kernel portion into the UMS kernel portion to replace old context information of the UMS kernel portion with the current context information of the primary kernel portion.

20. The system of claim 18, further comprising a CPU scheduler to schedule the execution of the UMS kernel portion on a CPU while the CPU retains the current context information of the primary user portion in its cache.

* * * * *